US012118259B2

United States Patent
Shimizu

(10) Patent No.: US 12,118,259 B2
(45) Date of Patent: Oct. 15, 2024

(54) INFORMATION PROCESSING APPARATUS AND INFORMATION PROCESSING METHOD FOR ADJUSTING DISPLAY BASED ON PRESENCE OR ABSENCE OF AN OBJECT IN A SPACE

(71) Applicant: Kanta Shimizu, Kanagawa (JP)

(72) Inventor: Kanta Shimizu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/796,306

(22) PCT Filed: Feb. 10, 2021

(86) PCT No.: PCT/IB2021/051052
§ 371 (c)(1),
(2) Date: Jul. 29, 2022

(87) PCT Pub. No.: WO2021/191694
PCT Pub. Date: Sep. 30, 2021

(65) Prior Publication Data
US 2023/0145521 A1     May 11, 2023

(30) Foreign Application Priority Data

Mar. 23, 2020 (JP) ................................ 2020-050539
Mar. 23, 2020 (JP) ................................ 2020-050608

(51) Int. Cl.
G09G 5/00     (2006.01)
G06F 3/14     (2006.01)
H04N 13/254     (2018.01)

(52) U.S. Cl.
CPC ............. *G06F 3/14* (2013.01); *H04N 13/254* (2018.05)

(58) Field of Classification Search
CPC .................................. G06F 3/14; H04N 13/254
(Continued)

(56) References Cited

U.S. PATENT DOCUMENTS

2010/0238139 A1*   9/2010   Goertz ................ G06F 3/0425
                                                              345/175
2012/0056982 A1   3/2012   Katz et al.
(Continued)

FOREIGN PATENT DOCUMENTS

CN     102265599 A     11/2011
CN     103020952 A     4/2013
(Continued)

OTHER PUBLICATIONS

International Search Report issued on Apr. 15, 2021 in PCT/IB2021/051052 filed on Feb. 10, 2021, 10 pages.
(Continued)

*Primary Examiner* — Jonathan M Blancha
(74) *Attorney, Agent, or Firm* — XSENSUS LLP

(57) ABSTRACT

An information processing apparatus for outputting three-dimensional information that is determined based on received light includes an image capture unit configured to capture two-dimensional image information; and an output unit configured to output the two-dimensional image information for displaying, and the three-dimensional information associated with coordinates of the two-dimensional image information.

18 Claims, 14 Drawing Sheets

(58) Field of Classification Search
USPC .......................................................... 345/156
See application file for complete search history.

(56) References Cited

U.S. PATENT DOCUMENTS

| | | | | |
|---|---|---|---|---|
| 2013/0241890 | A1* | 9/2013 | Sharma | G06F 3/0426 |
| | | | | 345/175 |
| 2015/0178257 | A1* | 6/2015 | Jones | G06T 19/006 |
| | | | | 345/419 |
| 2016/0148433 | A1 | 5/2016 | Petrovskaya et al. | |
| 2018/0139431 | A1* | 5/2018 | Simek | H04N 13/271 |
| 2018/0232947 | A1 | 8/2018 | Nehmadi et al. | |
| 2019/0394447 | A1 | 12/2019 | Yokota et al. | |
| 2020/0029025 | A1 | 1/2020 | Yokota et al. | |
| 2022/0224831 | A1* | 7/2022 | Yoshida | H04N 13/239 |

FOREIGN PATENT DOCUMENTS

| | | |
|---|---|---|
| CN | 106998413 A | 8/2017 |
| CN | 107710015 A | 2/2018 |
| CN | 108027238 A | 5/2018 |
| CN | 109791207 A | 5/2019 |
| JP | 9-326025 | 12/1997 |
| JP | 2002-216167 A | 8/2002 |
| JP | 2011-077606 | 4/2011 |
| JP | 2015-005925 | 1/2015 |
| JP | 2018-152632 | 9/2018 |
| KR | 10-2018-0028855 A | 3/2018 |

OTHER PUBLICATIONS

Orghidan R, et al."Modelling and accuracy estimation of a new omnidirectional depth computation sensor", May 1, 2006 (May 1, 2006), vol. 27, No. 7, pp. 843-853.
Office Action including Search Report for Chinese Patent Application No. CN202180021368.4, mailed Dec. 25, 2023, 22 pages.
Notice of Allowance issued Feb. 26, 2024 in Korean Patent Application No. 10-2022-7029613, 7 pages.

* cited by examiner

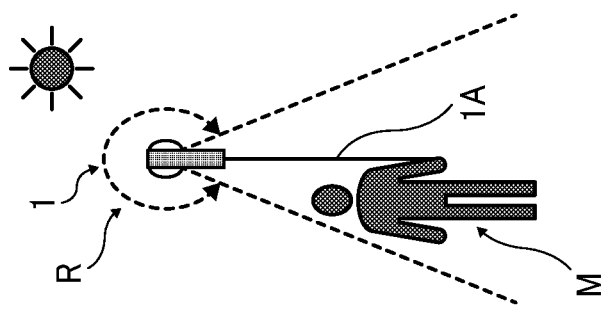
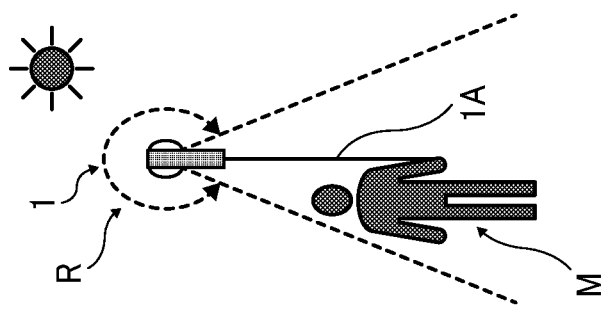
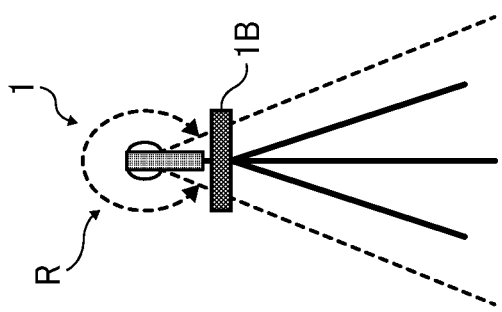
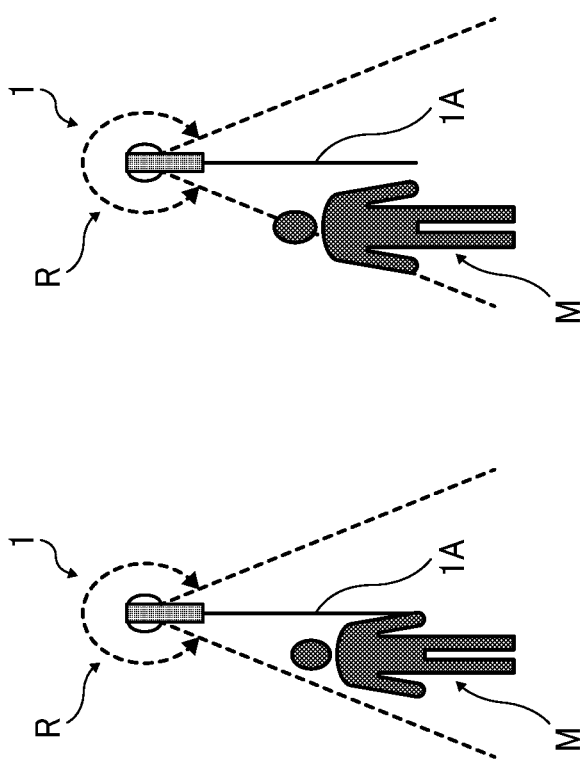

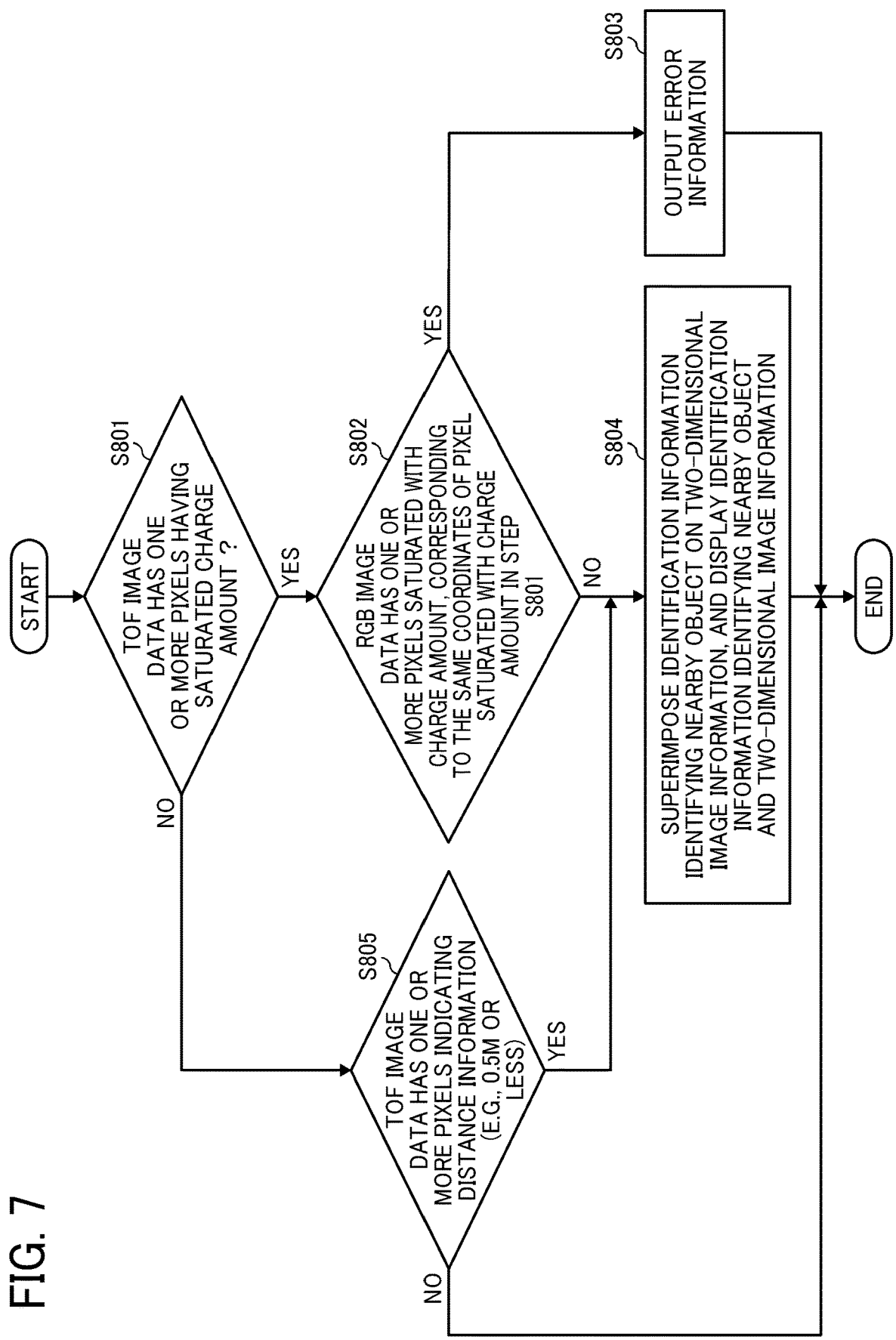

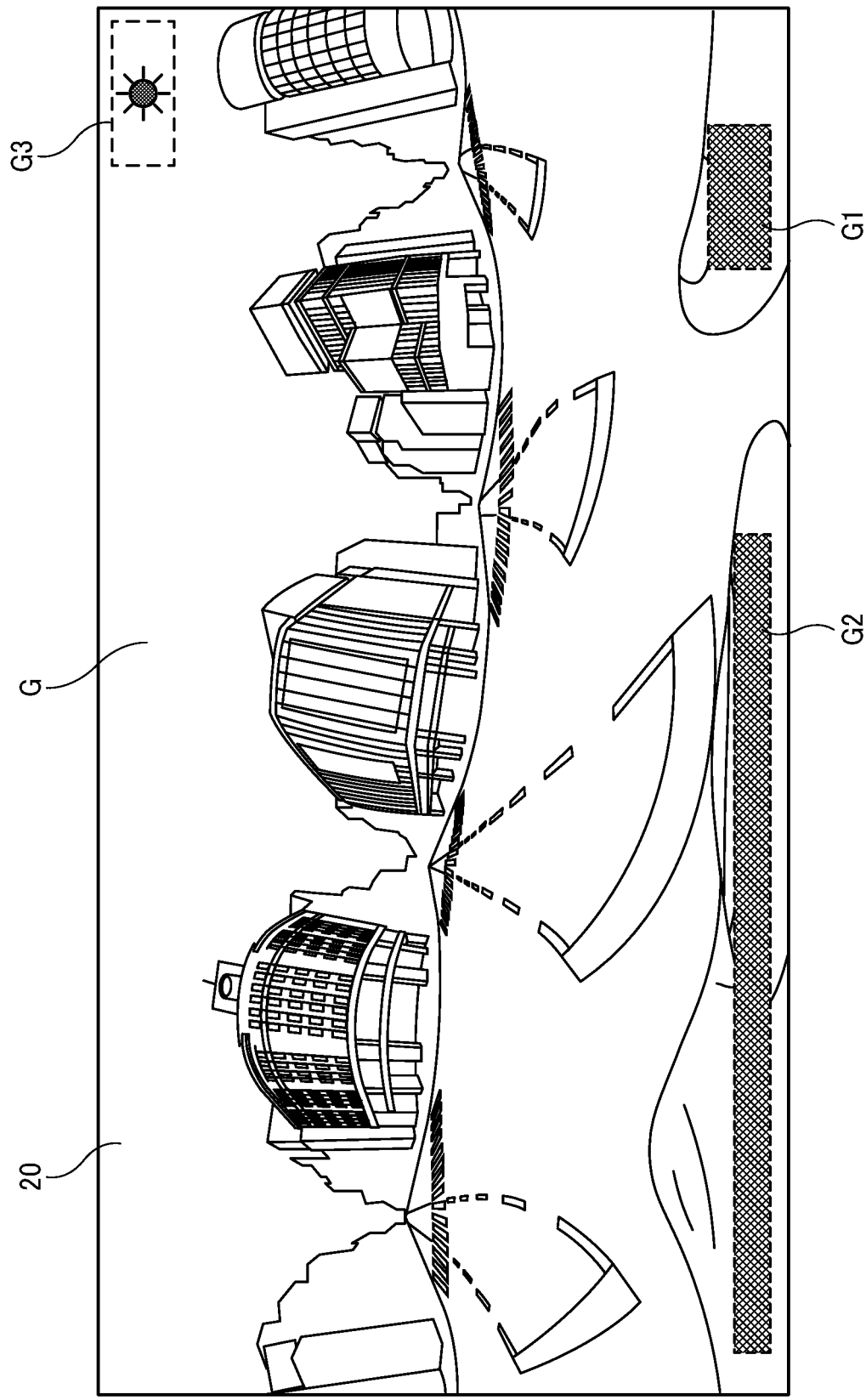

INFORMATION PROCESSING APPARATUS AND INFORMATION PROCESSING METHOD FOR ADJUSTING DISPLAY BASED ON PRESENCE OR ABSENCE OF AN OBJECT IN A SPACE

CROSS-REFERENCE TO RELATED APPLICATIONS

The present application is based on PCT filing PCT/IB2021/051052, filed Feb. 10, 2021, which claims priority to Japanese Patent Application Nos. 2020-050539 filed on Mar. 23, 2020, and 2020-050608 filed on Mar. 23, 2020, the entire contents of each are incorporated herein by its reference.

TECHNICAL FIELD

This disclosure relates to an information processing apparatus, and a method of processing information.

BACKGROUND

JP-2018-077071-A describes a ranging device that can measure a range or distance to an object stably and correctly.

JP-2011-077606-A describes an imaging apparatus that performs image processing to reduce an influence of inclusion of finger or the like in captured images when the finger or the like is included in the captured images.

CITATION LIST

Patent Literature

PTL1

JP-2018-077071-A

PTL2

JP-2011-077606-A

SUMMARY

Technical Problem

This disclosure discloses an embodiment that is devised in view of the above described issue to provide an information processing apparatus and a method of processing information that can easily confirm that desired three-dimensional information is acquired without unwanted objects.

Solution to Problem

In one aspect of the present invention, an information processing apparatus for outputting three-dimensional information that is determined based on received light, includes an image capture unit configured to capture two-dimensional image information; and an output unit configured to output the two-dimensional image information for displaying, and the three-dimensional information associated with coordinates of the two-dimensional image information.

Advantageous Effects of Invention

As to one or more embodiments of this disclosure, an information processing apparatus and a method of processing information that can easily confirm that desired three-dimensional information is acquired without unwanted objects can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 3A is an example of situation using an imaging apparatus according to an embodiment of this disclosure.

FIG. 3B is an example of situation using an imaging apparatus according to an embodiment of this disclosure.

FIG. 3C is an example of situation using an imaging apparatus according to an embodiment of this disclosure.

FIG. 3D is an example of situation using an imaging apparatus according to an embodiment of this disclosure.

FIG. 7 is an example of flowchart of determining a nearby object according to an embodiment of this disclosure.

FIG. 8 is an example of view displaying contents using a display unit according to an embodiment of this disclosure.

DESCRIPTION OF EMBODIMENTS

Figure 1:
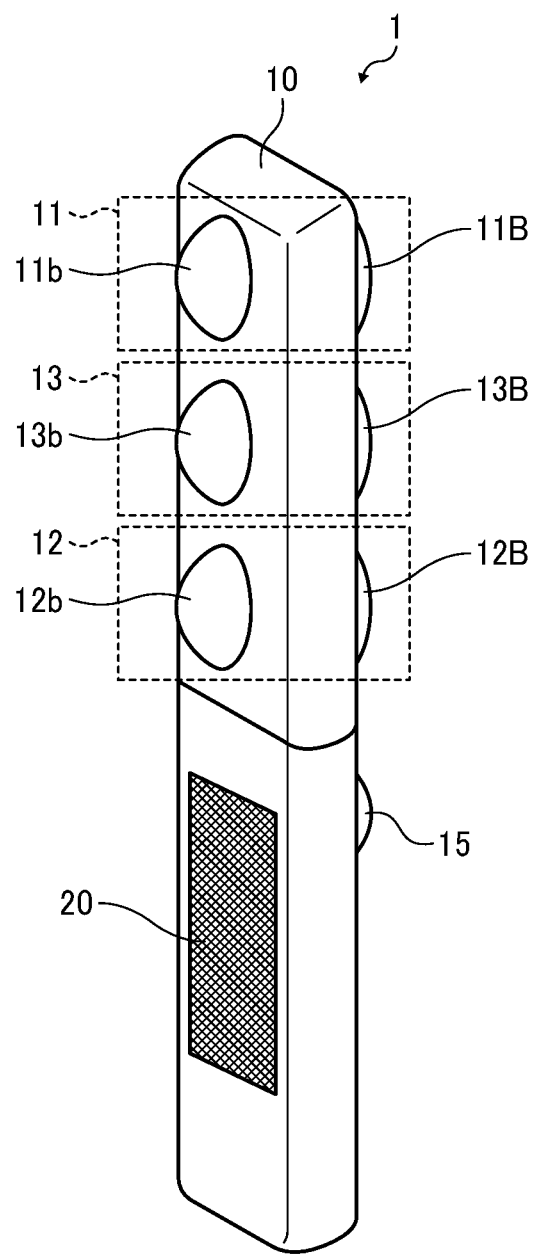
FIG. 1 is an example of external appearance of an imaging apparatus according to an embodiment of this disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, a description is given of a configuration for carrying out the present invention with reference to the drawings.

Hereinafter, a description is given of one or more embodiments of an imaging apparatus, an image capturing/processing method, an information processing apparatus, and an information processing method in detail with reference to the accompanying drawings.

Figure 2:
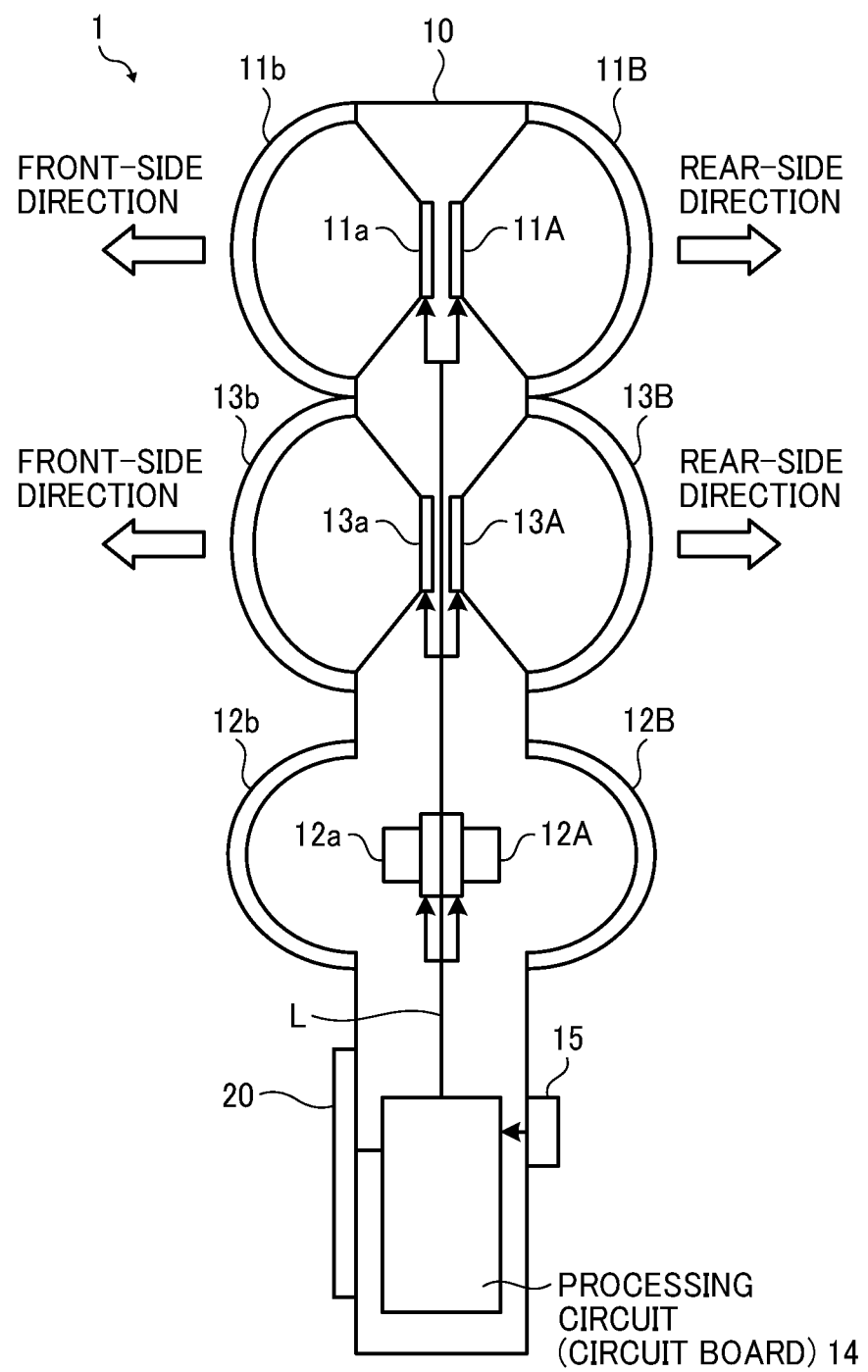
FIG. 2 is a cross sectional view of configuration of an imaging apparatus according to an embodiment of this disclosure.

FIG. 1 is an example of external appearance of an imaging apparatus 1 according to an embodiment of this disclosure. FIG. 2 an example of cross sectional view of configuration of the imaging apparatus 1. FIG. 2 illustrates an internal configuration of the imaging apparatus 1 of FIG. 1.

The imaging apparatus 1 is an example of information processing apparatus that outputs three-dimensional information that is determined based on received light.

As illustrated in FIG. 1, the imaging apparatus 1 includes, for example, an image capture unit 11 (i.e., camera), a projection unit 12, a distance information acquisition unit 13, which are integrally housed in a housing 10 (or casing 10).

The projection unit 12 corresponds to a light emitting unit provided for a range sensor, which projects light other than visible light.

The distance information acquisition unit 13 corresponds to a light receiving unit provided for the range sensor, which acquires distance information based on the light projected by the projection unit 12 and reflected from an object. These respective units are configured to be electrically connected to a processing circuit 14 (see FIG. 2) disposed in the housing 10 via a synchronization signal line L (see FIG. 2), and configured to be operated in synchronization with each other.

As illustrated in FIG. 1, the imaging apparatus 1 further includes an image capture switch 15, which is used by a user for inputting an image capture instruction signal to the processing circuit 14.

As illustrated in FIG. 1, the imaging apparatus 1 may further include a display unit 20 that displays content corresponding to output signal received from the processing circuit 14. The display unit 20 employs, for example, a liquid crystal screen or the like. The display unit 20 may employ, for example, a touch panel to receive an operation input by a user.

The processing circuit 14 controls the above described respective units to acquire information, such as red/green/blue (RGB) image data and distance information data, and reconstructs the acquired distance information data into higher-density three-dimensional point group data based on the acquired RGB image data and distance information data. The three-dimensional point group data can be constructed using the distance information data without processing the distance information data, but in this case, the precision of three-dimensional point group data is limited to the number of pixels (i.e., resolution) of the distance information acquisition unit 13.

As to the embodiment of this disclosure, processing for reconstructing the distance information data into higher-density three-dimensional point group data is described.

The reconstructed data is output to an external apparatus or device, such as personal computer (PC) or the like via a portable recording medium or communication network, and is then used for displaying three-dimensional restoration model.

Each of the above described respective units and the processing circuit 14 are supplied with power from a battery included in the housing 10. Alternatively, the power may be supplied from an outside of the housing 10 via connection cord or wirelessly.

The image capture unit 11, which captures two-dimensional image information, includes, for example, image capture elements 11a and 11A, and fish-eye lenses 11b and 11B. The fish-eye lens is an example of wide-angle lens.

The projection unit 12 includes, for example, light source units 12a and 12A, and wide-angle lenses 12b and 12B.

The distance information acquisition unit 13 includes, for example, time-of-flight (TOF) sensors 13a and 13A, and wide-angle lenses 13b and 13B.

Although not illustrated, each unit may be configured using an optical system including a prism and a lens group. For example, the image capture unit 11 may be configured using an optical system for focusing the light collected by the fish-eye lenses 11b and 11B onto the image capture elements 11a and 11A. Further, the projection unit 12 may be configured using an optical system for guiding the light from the light source units 12a and 12A to the wide-angle lenses 12b and 12B. Further, the distance information acquisition unit 13 may be configured using an optical system for focusing the light collected by the wide-angle lenses 13b and 13B onto the TOF sensors 13a and 13A. Each optical system may be appropriately designed in accordance with the configuration and arrangement of the image capture elements 11a and 11A, the light source units 12a and 12A, and the TOF sensors 13a and 13A. In this description, the optical system including the prism and lens group is omitted from the description.

The image capture elements 11a and 11A, the light source units 12a and 12a, and the TOF sensors 13a and 13A are integrally housed in the housing 10. The fish-eye lens 11b, the wide-angle lens 12b, the wide-angle lens 13b, and the display unit 20 are provided on a first face (i.e., front side) of the housing 10. As to the first face, each of the fish-eye lens 11b, the wide-angle lens 12b, and the wide-angle lens 13b has an internal open space.

Further, the fish-eye lens 11B, the wide-angle lens 12B, the wide-angle lens 13B, and the image capture switch 15 are provided on a second face (i.e., rear side) of the housing 10. As to the second face, each of the fish-eye lens 11B, the wide-angle lens 12B, and the wide-angle lens 13B has an internal open space.

The image capture elements 11a and 11A are image sensors (or area sensors) having a given two-dimensional resolution. Each of the image capture elements 11a and 11A has an image capture area, in which a large number of light receiving elements (e.g., photodiodes) corresponding respective pixels are arranged in a two-dimensional direction. The image capture area is provided a color filter of red (R), green (G) and blue (B) using, for example, Bayer arrangement for receiving visible light, and the light passing through the color filter is accumulated as electricity in the photodiodes. In this description, an image sensor having a large number of pixels is used so that a two-dimensional image of wider angle area (e.g., a range of hemisphere having a circumference of 180 degrees setting an image capture direction illustrated in FIG. 2 as a front side) can be acquired with higher resolution.

Each of the image capture elements 11a and 11A converts the light focused on the image capture area into an electric signal using a pixel circuit provided for each pixel, and then outputs higher-resolution RGB image data.

Each of the fish-eye lenses 11b and 11B collects the light from a wider angle area (e.g., a range of hemisphere having a circumference of 180 degrees setting an image capture direction illustrated in FIG. 2 as a front side), and focuses the light on the image capture area of the respective image capture elements 11a and 11A.

Each of the light source units 12a and 12A is, for example, a semiconductor laser that emits laser beam light having a wavelength band other than the visible light region (e.g., infrared light) for measuring a range or distance. Each of the light source units 12a and 12A can employ a single semiconductor laser or a combination of a plurality of semiconductor lasers. Further, the semiconductor laser can employ a surface emitting type semiconductor laser, such as vertical cavity surface emitting laser (VCSEL).

Further, an optical lens can be disposed to form the light of semiconductor laser into a vertically long light, and then the vertically long light can be scanned in an one-dimensional direction of a measurement range using an optical deflection element, such as micro electro mechanical systems (MEMS) mirror.

In this description, the light source units 12a and 12A emit the light of semiconductor laser LA to a wider angle area through the wide-angle lenses 12b and 12B without using the optical deflection element, such as MEMS mirror.

The wide-angle lenses 12b and 12b of the light source units 12a and 12A have a function of expanding the light emitted from the light source units 12a and 12A to a wider angle area (e.g., a range of hemisphere having a circumference of 180 degrees setting the image capture direction illustrated in FIG. 2 as the front side).

Each of the wide-angle lenses 13b and 13B of the distance information acquisition unit 13 respectively receives reflection light of the light source units 12a and 12A, corresponding to the light projected by the projection unit 12, from each direction of the wider-angle area, which is a measurement range (e.g., a range of hemisphere having a circumference of 180 degrees setting the image capture direction illustrated in FIG. 2 as the front side), and respectively focuses the light onto the light receiving area of the TOF sensors 13a and 13A.

The measurement range indicates a space including one or more objects to be projected with light (e.g., target object, such as building). The light reflected from the target object (reflection light) enters each of the wide-angle lenses 13b and 13B. The reflection light may be received, for example, by providing a filter for cutting a light having a wavelength range shorter than the infrared wavelength range on the entire face of each of the wide-angle lenses 13b and 13B. Further, the configuration is not limited thereto. For example, since it is sufficient if the light of infrared region enters the light receiving area, a unit for passing the light of infrared region, such as filter, may be provided in an optical path from the wide-angle lenses 13b and 13B to the light receiving area.

Each of the TOF sensors 13a and 13A is an optical sensor having a two-dimensional resolution. Each of the TOF sensors 13a and 13A has the light receiving area, in which a large number of light receiving elements (e.g., photodiodes) are arranged in a two-dimensional direction. In this description, each of the TOF sensors 13a and 13A may be referred to as "second imaging light receiving unit". Each of the TOF sensors 13a and 13A receives the reflection light of each area in the measurement range (each area is also referred to as a position) using the light receiving element corresponding to each area, and then measures or calculates a distance or range to each area based on the light detected by each light receiving element.

In the embodiment, the distance is measured using a phase difference detection method. As to the phase difference detection method, a laser beam light having modulated an amplitude at a fundamental frequency is irradiated toward the measurement range to receive the reflection light, and then a phase difference between the irradiation light and the reflection light is measured to acquire or obtain a time period between an emission start time of irradiation light and a reception time of reflection light, and then the distance is calculated by multiplying the time period with the speed of light. The phase difference detection can secure a certain level of resolution.

Each of the TOF sensors 13a and 13A, driven in synchronization with the projection of the irradiation light by the projection unit 12, calculates the distance corresponding to each pixel from the phase difference for the reflection light at each light receiving element (corresponding to each pixel), and outputs distance-information-included image data (hereinafter, referred to as "distance image" or "TOF image"), in which information indicating the distance to each area within the measurement range is associated with the pixel information.

Further, each of the TOF sensors 13a and 13A may be configured to output the phase information image data, in which the phase information is associated with the pixel information, and acquire the distance-information-included image data based on the phase information image data by performing the post-processing.

Further, the number of areas divided in the measurement range can be determined in view of the resolution of the light receiving area. Therefore, when a lower resolution is used to reduce the size of apparatus, the number of pixel information of distance image data decreases, and thereby the number of three-dimensional point groups also decreases.

Further, instead the phase difference detection method, the distance may be measured using a pulse method. As to the pulse method, for example, each of the light source units 12a and 12A emits an irradiation pulse P1 of ultra-short pulse having a rise time of several nanoseconds (ns) and stronger intensity peak power, and in synchronization with the emission of the irradiation pulse P1, each of the TOF sensors 13a and 13A measures a time (t) required to receive a reflection pulse P2, which is the reflection light corresponding to the irradiation pulse P1 emitted from the light source units 12a and 12A. When the pulse method is employed, for example, each of the TOF sensors 13a and 13A includes one or more circuits for measuring the time at an output side of the light receiving element. Each circuit converts the time period required for receiving the reflection pulse P2 after emitting the irradiation pulse P1 from each of the light source units 12a and 12A into the distance information for each light receiving element to acquire or obtain the distance to each area.

The pulse method is suitable for setting a wider-angle area for the imaging apparatus 1 because the pulse method can output the intensity-stronger light using the peak light. Further, when the MEMS mirror or the like is used to oscillate or scan the light, the intensity-stronger light can be irradiated far away while reducing the spread angle of light, with which the measurement distance can be increased. In this case, the light source units 12a and 12A, the wide-angle lenses 12b and 12B, and the MEMS mirror are arranged in a given configuration so that the laser beam light emitted from each of the light source units 12a and 12A scans or deflects toward the wide-angle lenses 12b and 12B by the MEMS mirror.

Further, an effective angle of view of the image capture unit 11 and an effective angle of view of the distance information acquisition unit 13 are preferably match with each other, for example, 180 degrees or more, but the effective angle of view of the image capture unit 11 and the effective angle of view of the distance information acquisition unit 13 are not necessarily matched with each other. The effective angle of view of the image capture unit 11 and the effective angle of view of the distance information acquisition unit 13 may be respectively reduced as needed.

In the embodiment, the image capture unit 11 and the distance information acquisition unit 13 reduce the number of effective pixels, for example, within a range of 100 degrees to 180 degrees so that the body of the imaging apparatus 1 and the distance information acquisition unit 13 are not included in the angle of view.

Further, the resolution of the TOF sensors 13a and 13A may be set lower than the resolution of the image capture elements 11a and 11A to set a priority on the size reduction or downsizing of the imaging apparatus 1. By setting the resolution of the TOF sensors 13a and 13A lower than the resolution of the image capture elements 11a and 11A, the size of the imaging apparatus 1 can be reduced because the size of the light receiving area can be reduced. Therefore, each of the TOF sensors 13a and 13A can be set with the lower resolution, and the three-dimensional point group acquired or obtained by each of the TOF sensors 13a and 13A has a lower density, but the three-dimensional point group can be converted into a higher-density three-dimensional point group because the processing circuit 14 used as "acquisition unit" is provided. The processing for converting into the higher-density three-dimensional point group using the processing circuit 14 will be described later.

In the embodiment, as one example, the image capture element 11a, the light source unit 12a, and the TOF sensor 13a are aligned on a straight line along the longitudinal direction of the housing 10. Similarly, the image capture element 11A, the light source unit 12A, and the TOF sensor 13A are aligned on a straight line along the longitudinal direction of the housing 10. Hereinafter, an example of the image capture element 11a, the light source unit 12a, and the TOF sensor 13a will be described.

As illustrated in FIG. 2, the image capture area (image capture face) of the image capture element 11a and the light receiving area (light receiving face) of the TOF sensor 13a can be arranged along a direction orthogonal to the longitudinal direction, or can be arranged along the longitudinal direction by providing a prism or the like that changes a path of light direction (optical path) by 90 degrees. Further, the image capture element 11a, the light source unit 12a, and the TOF sensor 13a may be arranged along any direction depending on various configurations. That is, the image capture element 11a, the light source unit 12a, and the TOF sensor 13a are arranged along any direction so that the same measurement range can be set for measuring a distance to a target object. The image capture unit 11, the projection unit 12, and the distance information acquisition unit 13 are arranged on one side of the housing 10 to face toward the measurement range. In this configuration, the image capture element 11a and the TOF sensor 13a may be arranged along the same base line to set a parallel stereo configuration. By arranging the image capture element 11a and the TOF sensor 13a using the parallel stereo configuration, disparity data can be acquired or obtained using the output of the TOF sensor 13a even if the number of the image capture element 11a is one. The light source unit 12a is configured to irradiate the light to the measurement range of the TOF sensor 13a.

Processing Circuit

Hereinafter, a description is given of processing of the processing circuit 14. The TOF image acquired or obtained by the TOF sensors 13a and 13A has a lower resolution. Therefore, in the embodiment, the resolution is increased by the processing circuit 14, and then the higher-density three-dimensional point group data is reconstructed. Further, a part or all of the following processing performed by "information processing unit" such as the processing circuit 14 may be performed by an external device or apparatus.

As described above, the three-dimensional point group data reconstructed by the imaging apparatus 1 is output to an external device (e.g., PC) via a portable recording medium or communication network, and is used for displaying the three-dimensional restoration model.

With this configuration, compared to a case that the imaging apparatus 1 displays the three-dimensional restoration model on the imaging apparatus 1, the imaging apparatus 1 having a higher speed for processing data, a smaller size, and a light weight can be provided.

However, after leaving a site where a user acquires the three-dimensional information and then the three-dimensional information is restored by the external device, the user may recognize that user himself or herself or a tripod is included in the captured image, and that the three-dimensional information having the desired layout has not been acquired. In this situation, the user requires additional time and effort to revisit the site where the three-dimensional information was acquired.

This problem can be solved by bringing a three-dimensional restoration device to the site, but if the user brings the three-dimensional restoration device, the imaging apparatus 1 that can process data with the higher processing speed, and having the smaller size and light weight cannot be devised.

Further, this problem may be solved by transmitting the acquired three-dimensional information to the external device via a communication line and to receive the restored three-dimensional information from the external device. However, this method does not have a merit of higher processing speed, and further, since the three-dimensional information has a larger amount of information, it is difficult for the user to visually confirm the inclusion of the user himself or herself, tripod, or the like in the captured image.

In particular, in a case of full-view spherical three-dimensional information, it is extremely difficult for the user to visually confirm the inclusion of the user himself or herself, tripod, or the like in the captured image.

The above-described problem that the user himself or herself, tripod, or the like is included in the captured image, and the three-dimensional information of desired layout has not been acquired can be easily confirmed in real time using the imaging apparatus 1 of the embodiment.

FIGS. 3A, 3B, 3C, and 3D are examples of situations using the imaging apparatus 1 according to the embodiment.

In a situation illustrated in FIG. 3A, a user M and a selfie stick 1A holding the imaging apparatus 1 are not included in a full-view spherical image capture range R, and thereby the user M and the selfie stick 1A are not included in the full-view spherical image (i.e., captured image). In this description, the user M operates the imaging apparatus 1 to capture images.

In a situation illustrated in FIG. 3B, since the user M is included in the full-view spherical image capture range R, the user M is included in the full-view spherical image (i.e., captured image).

In a situation illustrated in FIG. 3C, since a tripod 1B holding the imaging apparatus 1 is included in the full-view spherical image capture range R, the tripod 1B is included in the full-view spherical image (i.e., captured image).

In a situation illustrated in FIG. 3D, since the user M and the selfie stick 1A holding the imaging apparatus 1 are not included in the full-view spherical image capture range R, the user M and the selfie stick 1A are not included in the full-view spherical image (i.e., captured image). But, since an external light (e.g., sunlight, light of lighting device) has a stronger intensity, there is a possibility of erroneously determining that an object is included in the captured image.

Further, in the situations indicated in FIGS. 3B and 3C, since color, type, and appearance of objects to be included in the captured image are various, conventional methods have difficulties to determine whether the object, such as user, is included in the captured image.

If the above described situations indicated in FIGS. 3B and 3C occur, when determining presence or absence of a specific object (e.g., nearby object), such as the user himself or herself, and tripod, based on the distance-information-included image data output from the TOF sensors 13a and 13A, it is difficult to distinguish whether the specific object really exists or whether the external light is too strong.

That is, in a case where the charge amount of a specific pixel of the TOF sensors 13a and 13A is saturated, it is difficult to distinguish only from the output of the TOF sensors 13a and 13A whether the saturated charge amount is caused by the presence of the specific object, or caused by the too-strong intensity of external light.

In view of the above described problem, the imaging apparatus 1 is configured to correctly confirm whether or not a specific object, such as the user himself or herself, or nearby object (e.g., tripod), is included in the captured image by distinguishing the specific object from the influence of the external light.

Figure 4:
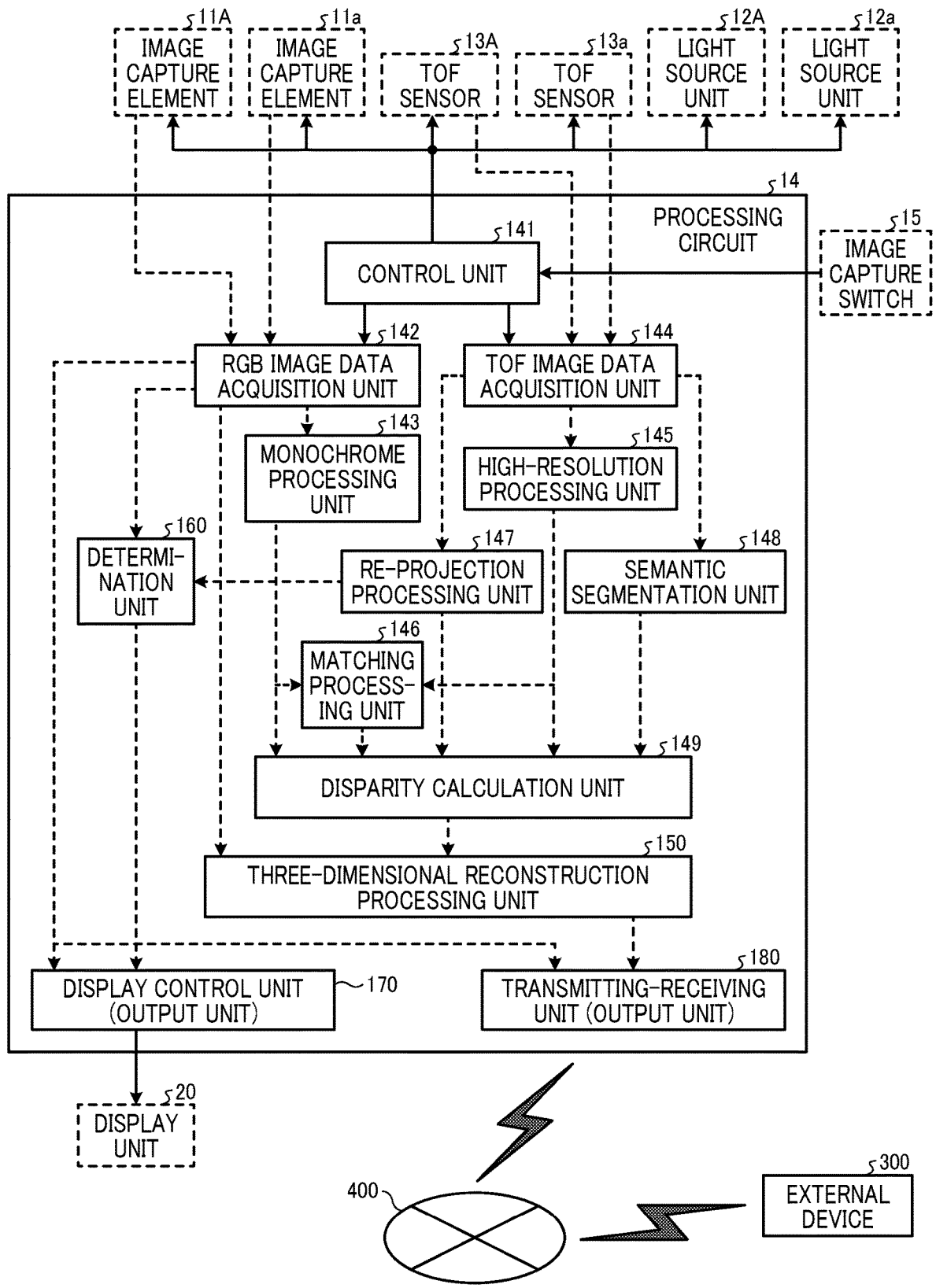
FIG. 4 is an example of functional block diagram of a processing circuit according to an embodiment of this disclosure.

FIG. 4 is an example of functional block diagram of the processing circuit 14. As illustrated in FIG. 4, the processing circuit 14 includes, for example, a control unit 141, an RGB image data acquisition unit 142, a monochrome processing unit 143, a TOF image data acquisition unit 144, a high-resolution processing unit 145, a matching processing unit 146, a re-projection processing unit 147, a semantic segmentation unit 148, a disparity calculation unit 149, a three-dimensional reconstruction processing unit 150, a determination unit 160, a display control unit 170 (example of output unit), and a transmitting-receiving unit 180 (example of output unit). In FIG. 4, a solid line arrow indicates a flow of signal, and a broken line arrow indicates a flow of data.

In response to receiving an ON signal (i.e., start signal of image capturing) from the image capture switch 15, the control unit 141 outputs a synchronization signal to the image capture elements 11a and 11A, the light source units 12a and 12A, and the TOF sensors 13a and 13A, and controls the processing circuit 14 entirely.

At first, the control unit 141 outputs a signal instructing the light source units 12a and 12A to emit an ultra-short pulse light, and outputs a signal instructing the TOF sensors 13a and 13A to generate TOF image data at the same timing.

Further, the control unit 141 outputs a signal instructing the image capture elements 11a and 11A to capture an image. In this configuration, the image capturing by the image capture elements 11a and 11A may be performed during a period in which the light is being emitted from the light source units 12a and 12A, or during a period immediately before and after the light is emitted from the light source units 12a and 12A.

The RGB image data acquisition unit 142 acquires the RGB image data captured by the image capture elements 11a and 11A based on the image capture instruction from the control unit 141, and outputs the RGB image data of full-view spherical image.

The monochrome processing unit 143 performs processing for setting data types for the matching processing with TOF image data acquired or obtained from the TOF sensors 13a and 13A. In this example case, the monochrome processing unit 143 converts the RGB image data of full-view spherical image into monochrome image data of full-view spherical image.

The TOF image data acquisition unit 144 acquires the TOF image data generated by the TOF sensors 13a and 13A based on the generation instruction of the TOF image data by the control unit 141, and outputs the TOF image data of full-view spherical image.

The high-resolution processing unit 145 assumes the TOF image data of full-view spherical image as a monochrome image data, and increases the resolution of the TOF image data. Specifically, the high-resolution processing unit 145 replaces a distance value associated with each pixel of the TOF image data of full-view spherical image with a value (grayscale value) of the monochrome image data of full-view spherical image.

Further, the high-resolution processing unit 145 increases the resolution of the monochrome image data of full-view spherical image to the resolution of the RGB image data of full-view spherical image acquired or obtained from the image capture elements 11a and 11A. The conversion to the higher resolution is performed, for example, by performing normal conversion increase processing.

Further, other conversion method can be applied. For example, a plurality of frames of TOF images of full-view spherical image generated successively is acquired, and then super-resolution processing is performed by adding a distance between adjacent points using the frames.

The matching processing unit 146 extracts a feature amount at a portion having texture from the monochrome image data of full-view spherical image acquired or obtained by converting the TOF image data of full-view spherical image into a higher resolution image data, and the monochrome image data of full-view spherical image corresponding to the RGB image data of full-view spherical image, and then performs the matching process based on the extracted feature amount. For example, the matching processing unit 146 extracts an edge from each monochrome image data, and then performs the matching processing on the extracted edge information.

Further, other conversion method can be applied. For example, the matching processing can be performed using a method in which texture changes are quantified, such as scale-invariant feature transform (SIFT). In this description, the matching process means a searching of corresponding pixel.

As one method of the matching processing, for example, block matching can be used. The block matching is a method of calculating a degree of similarity between a pixel value cut out as a block of M×M (M is a positive integer) pixel size in the vicinity of a pixel to be referenced, and a pixel value cut out as a block of M×M pixel size in the vicinity of a center pixel to be searched in the corresponding image, and setting the center pixel having the highest degree of similarity as a corresponding pixel.

Various methods can be used to calculate the similarity. For example, an equation indicating normalized correlation coefficient (NCC), such as normalized autocorrelation coefficient may be used. The NCC indicates that the higher the numerical value is, the higher the degree of similarity, and a value of NCC becomes 1 when the pixel values of the blocks completely match.

Further, since data of distance of texture-less area is also acquired or obtained from the TOF image data of full-view spherical image, the matching process may be performed by setting a weight depending on the area. For example, when performing the calculation using the equation indicating NCC, the calculation may be performed by setting a weight to a portion other than the edge (texture-less area).

Further, instead of the equation indicating NCC, a selective correlation coefficient (SCC) may be used.

The re-projection processing unit 147 re-projects the TOF image data of full-view spherical image indicating the distance of each position in the measurement range onto the two-dimensional coordinates (screen coordinate system) of the image capture unit 11. The re-projection is performed to determine which three-dimensional points calculated by the TOF sensors 13a and 13A are to be projected to which two-dimensional coordinates of the images captured by the image capture elements 11a and 11A.

The TOF image data of full-view spherical image indicates a position of each three-dimensional point in the coordinate system setting the distance information acquisition unit 13 as the center (mainly the wide-angle lenses 13b and 13B).

Therefore, the three-dimensional point indicated by the TOF image data of full-view spherical image is re-projected onto the coordinate system setting the image capture unit 11 as the center (mainly the fish-eye lenses 11b and 11B). For example, the re-projection processing unit 147 parallelly shifts the coordinates of three-dimensional points of TOF image data of full-view spherical image to the coordinates of three-dimensional points setting the image capture unit 11 as the center, and after shifting parallelly, the re-projection processing unit 147 converts the coordinates of three-dimensional points of TOF image data into a two-dimensional coordinate system (screen coordinate system) indicated by the RGB image data of full-view spherical image.

With this configuration, the coordinates of three-dimensional points of TOF image data of full-view spherical image and the coordinates of two-dimensional image information can be associated with each other.

The re-projection processing unit 147 associates the coordinates of the three-dimensional points of the TOF image data of the full-view spherical image and the coordinates of the two-dimensional image information of the full-view spherical image captured by the image capture unit 11.

The disparity calculation unit 149 calculates a disparity of each position from a deviation or fluctuation of distance with respect to the corresponding pixel, acquired by the matching process.

Further, the disparity matching process can be performed by searching peripheral pixels at the position of re-projection coordinates using the re-projection coordinates converted by the re-projection processing unit 147, with which the processing time can become shorter, and more detailed and higher resolution distance information can be acquired or obtained.

Further, the segmentation data acquired or obtained by performing the semantic segmentation processing using the semantic segmentation unit 148 can be used for the disparity matching processing. In this case, further detailed and higher resolution distance information can be acquired or obtained.

Further, the disparity matching processing may be performed only on the edge or portion having a greater feature amount, and the propagation processing may be performed on other portions using the TOF image data of full-view spherical image, and, for example, RGB image feature of full-view spherical image and a stochastic technique.

The semantic segmentation unit 148 applies a segmentation label indicating a target object to an input image of the measurement range using the deep learning. With this processing, each pixel of the TOF image data of full-view spherical image can be fixed to any one of a plurality of distance regions divided for each distance, with which the reliability of calculation can be further enhanced.

The three-dimensional reconstruction processing unit 150 acquires the RGB image data of full-view spherical image from the RGB image data acquisition unit 142, reconstructs the three-dimensional data of full-view spherical image based on the distance information output from the disparity calculation unit 149, and then outputs a higher-density three-dimensional point group of full-view spherical image adding color information to each three-dimensional point.

The three-dimensional reconstruction processing unit 150 is an example of three-dimensional information determination unit that determines three-dimensional information.

The determination unit 160 acquires the RGB image data of full-view spherical image from the RGB image data acquisition unit 142, and also acquires the TOF image data of full-view spherical image converted into the two-dimensional coordinate system indicated by the RGB image data of full-view spherical image from the re-projection processing unit 147, and then determines whether or not a specific object is included in the captured image based on these data, and outputs a determination result to the display control unit 170.

The display control unit 170 acquires the RGB image data of full-view spherical image from the RGB image data acquisition unit 142, and instructs the display unit 20 to display two-dimensional image information based on the acquired RGB image data of full-view spherical image.

Further, the display control unit 170 superimposes information indicating the determination result acquired or obtained from the determination unit 160 on the two-dimensional image information, and then instructs the display unit 20 to display the two-dimensional image information.

The display control unit 170 is an example of an output unit that outputs the two-dimensional image information captured by the image capture unit 11 separately from the three-dimensional information. The display unit 20 is an example of output destination to which the two-dimensional image information is output.

The display control unit 170 can be configured to acquire or obtain the three-dimensional data of full-view spherical image from the three-dimensional reconstruction processing unit 150, and to instruct the display unit 20 to display the three-dimensional information. Specifically, the display control unit 170 can select one mode in which the display control unit 170 instructs the display unit 20 to display the two-dimensional image information, and another mode in which the display control unit 170 instructs the display unit 20 to display the three-dimensional information in accordance with pre-set conditions. With this configuration, the display control unit 170 can output the two-dimensional image information separately from the three-dimensional information.

The transmitting-receiving unit 180 communicates with an external device by wire or wirelessly. The transmitting-receiving unit 180 transmits or outputs the three-dimensional data of full-view spherical image, output from the three-dimensional reconstruction processing unit 150, and the two-dimensional image information of full-view spherical image, output from the RGB image data acquisition unit 142, to an external device 300, which performs the three-dimensional restoration processing, via the network 400.

In this description, the two-dimensional image information captured by the image capture unit 11 means "original two-dimensional image information" used for creating "two-dimensional image data for displaying" or "two-dimensional image data for displaying". For example, the two-dimensional image information (i.e., original two-dimensional image information) captured by the image capture unit 11 can be processed inside the imaging apparatus 1 to create "two-dimensional image data for displaying, or the two-dimensional image information (i.e., original two-dimensional image information) captured by the image capture unit 11 can be transmitted to an external device from the imaging apparatus 1, and then the external device can create "two-dimensional image data for display" from the "original two-dimensional image information".

The transmitting-receiving unit 180 is an example of output unit that outputs the three-dimensional information. The external device 300 is an example of output destination to which the three-dimensional information is output.

Further, the transmitting-receiving unit 180 can be configured not to transmit the two-dimensional image information of full-view spherical image, but to transmit the three-dimensional data of full-view spherical image alone. Further, the transmitting-receiving unit 180 may be configured using an interface circuit that can communicate with a portable storage medium, such as secure digital (SD) card, and a personal computer.

Operation of Processing Circuit

Figure 5:
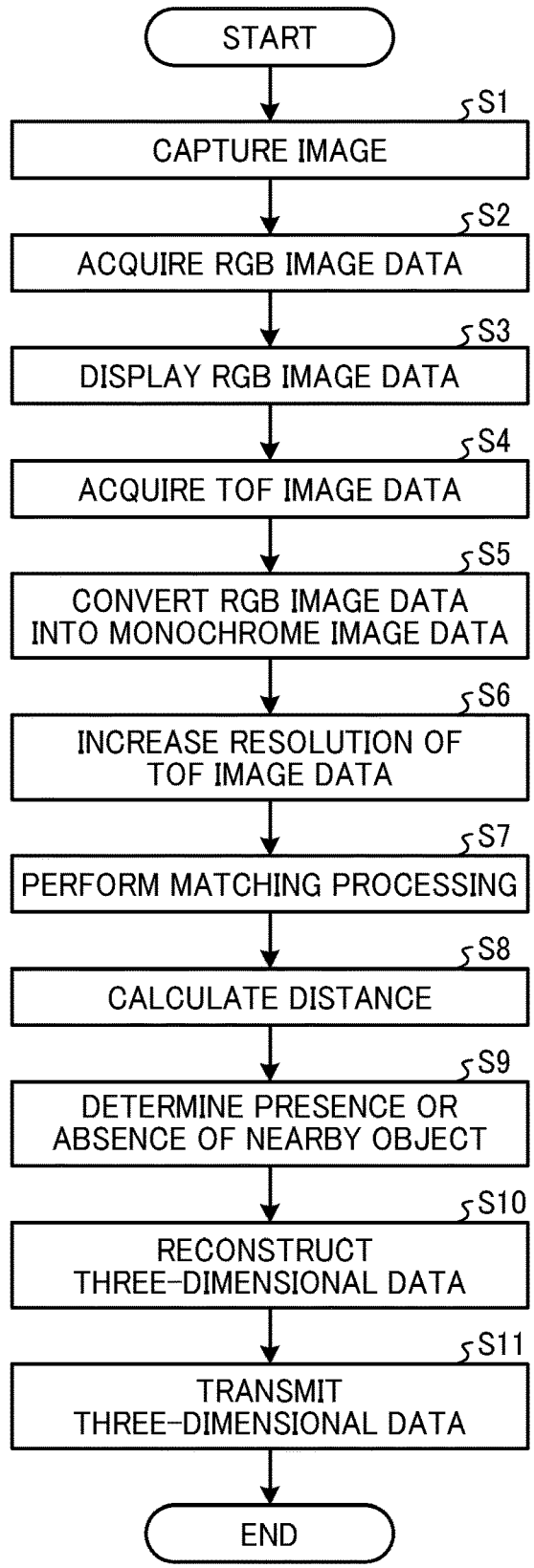
FIG. 5 is an example of a flowchart of operation of a processing circuit of an imaging apparatus according to an embodiment of this disclosure.

FIG. 5 is an example of a flowchart of operation of the processing circuit 14 of the imaging apparatus 1. When the image capture switch 15 is turned ON by a user and an image capture instruction signal is input, the control unit 141 of the processing circuit 14 performs an operation of generating a higher-density three-dimensional point group using a following method (an example of image capturing/processing method and information processing method).

At first, the control unit 141 drives the light source units 12*a* and 12A, the TOF sensors 13*a* and 13A, and the image capture elements 11*a* and 11A to capture an image of the measurement range (step S1). The control unit 141 instructs the light source units 12*a* and 12A to emit infrared light (an example of light projection step), and then the TOF sensors 13*a* and 13A receive the light reflected from an object (an example of light reception step). Further, the image capture elements 11*a* and 11A capture the image of the measurement range at the timing of start of driving the light source units 12*a* and 12A or in a period immediately near the timing of start of driving the light source units 12*a* and 12A (an example of image capturing step).

Then, the RGB image data acquisition unit 142 acquires RGB image data of the measurement range from the image capture elements 11*a* and 11A (step S2). Then, the display control unit 170 acquires the RGB image data of full-view spherical image from the RGB image data acquisition unit 142, and then instructs the display unit 20 to display two-dimensional image information based on the acquired RGB image data of full-view spherical image (an example of two-dimensional image information outputting step) (step S3).

The display control unit 170 instructs the display unit 20 to display two-dimensional image information of a partial region the acquired RGB image data of full-view spherical image, and then changes an area of the two-dimensional image information displayed by the display unit 20 in response to receiving various instructions input by a user. For example, if the imaging apparatus 1 is provided with one or more operation switches other than the image capture switch 15 or the display unit 20 as an input unit, such as touch panel, the user can input the various instructions using these switches and unit.

In step S3, the user can confirm, by viewing the two-dimensional image information displayed using the display unit 20, whether the user himself or herself, tripod, or the like is included in the captured image, and whether two-dimensional image information of the desired layout has been acquired or not.

Then, the TOF image data acquisition unit 144 acquires, from the TOF sensors 13*a* and 13A, TOF image data indicating a distance of each position in the two-dimensional region (step S4).

Then, the monochrome processing unit 143 converts the RGB image data into monochrome image data (step S5). Since the TOF image data is distance data while the RGB image data is RGB data (i.e., data types of TOF image data and RGB image data are different), the matching cannot be performed on the TOF image data and the RGB image data. Therefore, at first, each of the TOF image data and RGB image data is converted into the monochrome image data. As to the TOF image data, the high-resolution processing unit 145 converts a value indicating a distance of each pixel by directly replacing the value indicating the distance of each pixel with a value of monochrome image data before performing the resolution enhancement.

Then, the high-resolution processing unit 145 increases a resolution of the TOF image data (step S6).

Then, the matching processing unit 146 extracts a feature amount of a portion having texture for each monochrome image data, and then performs the matching processing using the extracted feature amount (step S7).

Then, the disparity calculation unit 149 calculates a disparity of each position from a distance deviation of the corresponding pixel to calculate a distance (step S8).

Then, the determination unit 160 acquires the RGB image data of full-view spherical image from the RGB image data acquisition unit 142, and also acquires the TOF image data of full-view spherical image converted into the two-dimensional coordinate system indicated by the RGB image data from the re-projection processing unit 147, and then determines presence or absence a nearby object (i.e., specific object) in the captured image based on the RGB image data of full-view spherical image and TOF image data of full-view spherical image, and then outputs a determination result to the display control unit 170.

Then, the display control unit 170 superimposes information indicating the determination result acquired or obtained from the determination unit 160 on the two-dimensional image information, and instructs the display unit 20 to display the two-dimensional image information (an example of displaying step) (step S9).

Then, the three-dimensional reconstruction processing unit 150 acquires the RGB image data from the RGB image data acquisition unit 142, reconstructs the three-dimensional data based on the distance information output from the disparity calculation unit 149, and then outputs a higher-density three-dimensional point group added with the color information to each three-dimensional point (step S10).

Then, the transmitting-receiving unit 180 transmits the three-dimensional data output from the three-dimensional reconstruction processing unit 150 and the two-dimensional image information output from the RGB image data acquisition unit 142 to the external device 300, which performs the three-dimensional restoration processing, via the network 400 (an example of three-dimensional information outputting step) (step S11).

The transmitting-receiving unit 180 can be configured to transmit the three-dimensional data output from the three-dimensional reconstruction processing unit 150 without transmitting the two-dimensional image information output from the RGB image data acquisition unit 142.

As described above, the imaging apparatus 1 includes the image capture unit 11, and the display control unit 170 that outputs the two-dimensional image information captured by the image capture unit 11 separately from the three-dimensional information.

With this configuration, without confirming the three-dimensional information, the user can easily confirm, from the two-dimensional image information, whether the user himself or herself, tripod, or the like is included in the captured image, and whether the three-dimensional information having the desired layout has been acquired or not.

Therefore, the user can re-acquire the three-dimensional information while staying at a site where the three-dimensional information was acquired or obtained, with which a work or labor of re-visiting the site where the three-dimensional information was acquired or obtained can be reduced compared to a case where the user recognizes that the user himself or herself, tripod, or the like is included in the captured image after leaving the site where the three-dimensional information was acquired, or that the three-dimensional information having the desired layout was not acquired.

In this description, the three-dimensional information includes, for example, three-dimensional information of full-view spherical image. In this case, if the full-view spherical three-dimensional information is captured and a user feels difficulty to confirm whether the user himself or herself, tripod, or the like is included in the captured image and whether the three-dimensional information having the desired layout has been acquired or not, the user can easily confirm, from the two-dimensional image information captured by the image capture unit 11, whether the user himself or herself, tripod, or the like is included in the captured image, and whether the three-dimensional information having the desired layout has been acquired or not.

The display control unit 170 outputs two-dimensional image information G in step S3 before the transmitting-receiving unit 180 transmits or outputs the three-dimensional information in step S11. Further, the display control unit 170 outputs the two-dimensional image information G in step S3 before the three-dimensional reconstruction processing unit 150 determines the three-dimensional information in step S10.

With this configuration, before confirming the three-dimensional information, the user can confirm, from the two-dimensional image information, whether the user himself or herself, tripod, or the like is included in the captured image, and whether the three-dimensional information having the desired layout has been acquired or not.

The imaging apparatus 1 can be provided with the display unit 20, in which the display control unit 170 instructs the display unit 20 to display the two-dimensional image information.

With this configuration, the user can easily confirm, from the two-dimensional image information displayed using the display unit 20, whether the user himself or herself, tripod, or the like is included in the captured image, and whether the three-dimensional information having the desired layout has been acquired or not.

The display control unit 170 can output the two-dimensional image information to the display unit 20, which is different from the external device 300 to which the transmitting-receiving unit 180 outputs the three-dimensional information.

With this configuration, the user can confirm whether the user himself or herself, tripod, or the like is included in the captured image, and whether the three-dimensional information having the desired layout has been acquired or not from the two-dimensional image information output to the display unit 20, which is different from the external device 300, without confirming the three-dimensional information output to the external device 300.

The imaging apparatus 1 can be provided with the three-dimensional reconstruction processing unit 150, which determines the three-dimensional information based on the output from the distance information acquisition unit 13. The three-dimensional reconstruction processing unit 150 determines the three-dimensional information based on the output received from the distance information acquisition unit 13 and the two-dimensional image information.

With this configuration, the user can confirm whether the user himself or herself, tripod, or the like is included in the captured image, and whether the three-dimensional information having the desired layout has been acquired or not from the two-dimensional image information captured by the image capture unit 11 without confirming the three-dimensional information determined by the three-dimensional reconstruction processing unit 150.

FIG. 6 is an example of a flowchart of a process of generating image data of full-view spherical image according to the embodiment.

Figure 6A:
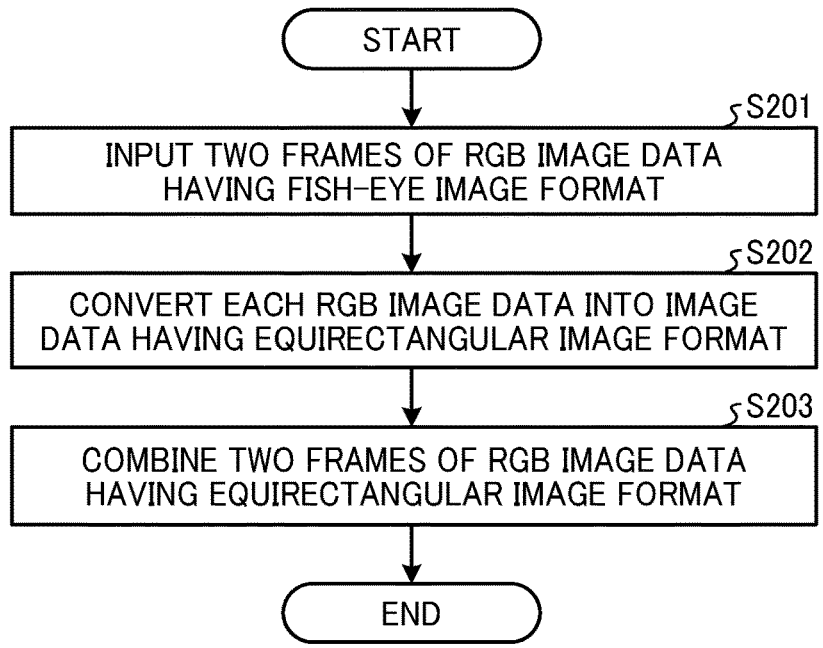
FIG. 6A is an example of flowchart of generating image data of full-view spherical image according to an embodiment of this disclosure.

FIG. 6A is an example of a flowchart of a process of generating RGB image data of full-view spherical image corresponding to step S2 described with reference to FIG. 5.

The RGB image data acquisition unit 142 inputs two frames of RGB image data having the fish-eye image format (step S201).

Then, the RGB image data acquisition unit 142 converts each of the two frames of RGB image data into image data having an equirectangular image format (step S202). The RGB image data acquisition unit 142 converts the two frames of RGB image data into the image data having the equirectangular image format based on the same coordinate system to facilitate an image combination or stitching in the next step S203. It should be noted that the RGB image data can be converted into the image data using one or more image formats other than the equirectangular image format as required. For example, the RGB image data can be converted into coordinates of image perspectively projected on an arbitrary face or coordinates of image perspectively projected on each face of an arbitrary polyhedron.

Hereinafter, a description is given of the equirectangular image format. The equirectangular image format is a format capable of expressing a full-view spherical image, and is a format of an image created using the equirectangular method (i.e., equirectangular image). The equirectangular method is a method in which two variables, such as latitude and longitude of globe, represent a three-dimensional direction, and displays a plane image in which the latitude and longitude are orthogonal with each other. Therefore, the equirectangular image is an image that is generated using the equirectangular method, and is expressed using coordinates having two angular variables of the spherical coordinate system as two axes.

Then, the RGB image data acquisition unit 142 combines or stitches the two frames of RGB image data generated in step S202 to generate one image of RGB image data of full-view spherical image (step S203). Each of the input two frames of RGB image data covers an area having a total angle of view of more than 180 degrees. Therefore, the full-view spherical image RGB image data generated by appropriately combining or stitching the two frames of RGB image data can cover a full-view spherical image area.

Further, the combining or stitching processing in step S203 can use any known technique for combining or stitching a plurality of images, and the method is not particularly limited.

Figure 6B:
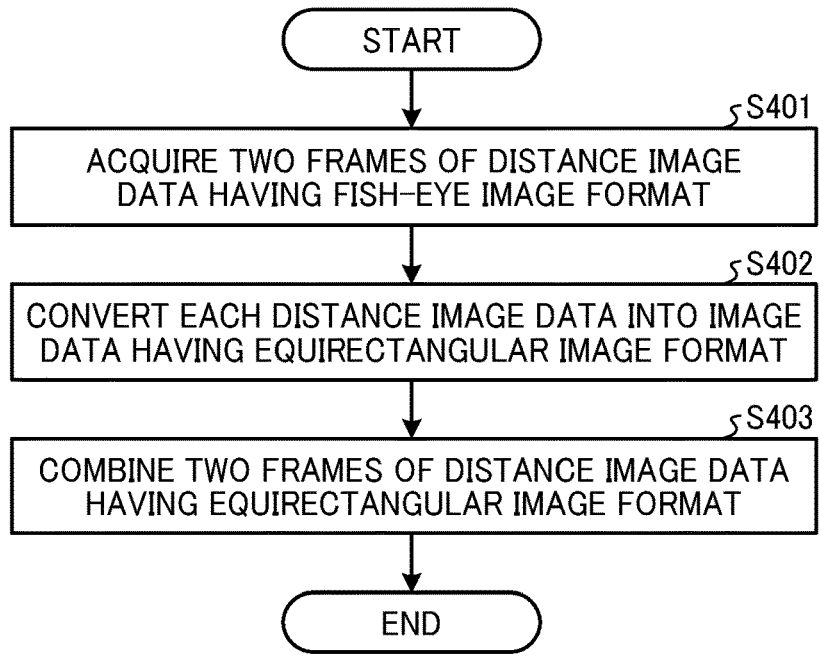
FIG. 6B is an example of flowchart of generating image data of full-view spherical image according to an embodiment of this disclosure.

FIG. 6B is an example of a flowchart illustrating a process of generating the TOF image data of full-view spherical image corresponding to step S4 described with reference to FIG. 5.

The TOF image data acquisition unit 144 acquires two frames of distance image data having the fish-eye image format (step S401).

Then, the TOF image data acquisition unit 144 converts the two frames of TOF image data having the fish-eye image format into image data having the equirectangular image format (step S402). As described above, the equirectangular image format is a format capable of expressing a full-view spherical image. In step S402, the two frames of TOF image data are converted into the image data having the equirectangular image format based on the same coordinate system to facilitate the image combining or stitching processing in the next step S403.

Then, the TOF image data acquisition unit 144 combines or stitches the two frames of TOF image data generated in step S402 to generate TOF image data of one full-view spherical image (step S403). Each of the two input frames of TOF image data covers an area having a total angle of view of more than 180 degrees. Therefore, the full-view spherical image TOF image data generated by appropriately combining or stitching the two frames of TOF image data can cover a full-view spherical image area.

Further, the combining or stitching processing in step S403 can use any known technique for combining or stitching a plurality of images, and the method is not particularly limited.

FIG. 7 is an example of flowchart of determining a nearby object according to the embodiment.

FIG. 7 is a flowchart illustrating a process of determining whether or not a nearby object is included in a captured image, which corresponds to step S9 described with reference to FIG. 5.

The determination unit 160 determines, based on the TOF image data of full-view spherical image acquired or obtained from the re-projection processing unit 147, whether the TOF image data of full-view spherical image has one or more pixels having saturated charge amount (step S801).

If the determination unit 160 determines that the TOF image data of full-view spherical image has the one or more pixel having the saturated charge amount in step S801 (S801: YES), based on the RGB image data of full-view spherical image acquired or obtained from the RGB image data acquisition unit 142, the determination unit 160 determines whether the RGB image data of full-view spherical image has one or more pixels, having the same coordinates of the one or more pixels saturated with the charge amount in step S801, have the saturated charge amount (step S802).

If the determination unit 160 determines that the RGB image data of full-view spherical image has the one or more pixel saturated with the charge amount in step S802 (S802: YES), the determination unit 160 determines that the pixel having the saturated charge amount in step 5801 is caused by an external light (e.g., sunlight, light of lighting device), and outputs error information to the display control unit 170.

Then, based on the error information acquired or obtained from the determination unit 160, the display control unit 170 superimposes the error information on the two-dimensional image information, and then instructs the display unit 20 to display the two-dimensional image information superimposed with the error information (step S803).

If the determination unit 160 determines that the RGB image data of full-view spherical image has no pixel saturated with the charge amount in step S802 (S802: NO), the determination unit 160 determines that the pixel having the saturated charge amount in step S801 is caused by a presence of nearby object, and outputs coordinate position information of the pixel having the saturated charge amount in step S801 to the display control unit 170.

Then, based on the coordinate position information on the pixel acquired or obtained from the determination unit 160, the display control unit 170 superimposes identification information identifying the nearby object on the two-dimensional image information, and then instructs the display unit 20 to display the identification information identifying the nearby object superimposed on the two-dimensional image information (step S804).

If the determination unit 160 determines that the TOF image data of full-view spherical image has no pixel saturated with charge amount in step S801 (S801:NO), based on the TOF image data of full-view spherical image acquired or obtained from the re-projection processing unit 147, the determination unit 160 determines whether the TOF image data of full-view spherical image has one or more pixels indicating given distance information, such as 0.5 m or less, in the TOF image data of full-view spherical image (step S805).

If the determination unit 160 determines that the TOF image data of full-view spherical image has no pixel indicating the distance information of 0.5 m or less in step S805 (S805: NO), the determination unit 160 ends the sequence.

If the determination unit 160 determines that the TOF image data of full-view spherical image has the one or more pixels indicating the distance information of 0.5 m or less in step S805 (S805: YES), the determination unit 160 proceeds the sequence to step S804. If step S805 is YES, the determination unit 160 determines that the pixel indicating the distance information of 0.5 m or less is caused by a presence of nearby object, and outputs the coordinate position information of the pixel indicating the distance information of 0.5 m or less in step S805 to the display control unit 170.

Then, in step S804, based on the coordinate position information of the pixel acquired or obtained from the determination unit 160, the display control unit 170 instructs the display unit 20 to display the identification information identifying the nearby object by superimposing the identification information identifying the nearby object on the two-dimensional image information.

As described above, if the determination unit 160 determines that the nearby object exists, the display control unit 170 superimposes the identification information on the two-dimensional image information, and if the determination unit 160 determines that the nearby object does not exist, the display control unit 170 does not superimpose the identification information on the two-dimensional image information.

That is, the display control unit 170 instructs the display unit 20 to output a different display in accordance with the presence or absence of nearby object.

Further, based on the coordinate position information of the pixel acquired or obtained from the determination unit 160, the display control unit 170 instructs the display unit 20 to display the identification information identifying the nearby object on the two-dimensional image information.

That is, the display control unit 170 instructs the display unit 20 to set a display position of nearby object in accordance with a position of nearby object in a space, which means the display position of each nearby object becomes different in accordance with the position of each nearby object in the space.

FIG. 8 is an example of view displaying contents using the display unit according to the embodiment.

FIG. 8 is a view corresponding to step S3 in FIG. 5 and steps S803 and S804 in FIG. 7.

As illustrated in FIG. 8, the display control unit 170 instructs the display unit 20 to display the two-dimensional image information G. Further, as illustrated in FIG. 8, the display control unit 170 instructs the display unit 20 to display identification information G1 and G2 identifying respective nearby objects (e.g., finger, tripod), and error information G3 by superimposing the identification information G1 and G2 and error information G3 on the two-dimensional image information G. The error information G3 may be a mark indicating "sunlight" as illustrated in FIG. 8 or "lighting device."

As described above, the imaging apparatus 1 includes the image capture unit 11 for capturing an image of a target object, the projection unit 12 for projecting light onto the target object, the distance information acquisition unit 13 for receiving the light reflected from the target object, and the display control unit 170 for instructing the display unit 20 to output a different display in accordance with the presence or absence of nearby object that is determined based on the output information received from the distance information acquisition unit 13 and the output information of the image capture unit 11.

With this configuration, the user can correctly confirm whether or not the user himself or herself, and the nearby object (e.g., tripod) is included in the captured image by distinguishing the nearby object from the influence of the external light.

As above described, the imaging apparatus 1 is provided with the display unit 20. With this configuration, the user can correctly check whether or not the nearby object is included in the captured image.

As above described, the display control unit 170 instructs the display unit 20 to set a display position of nearby object in accordance with a position of nearby object in a space, which means the display position of nearby object becomes different in accordance with the position of each nearby object in the space. With this configuration, the user can confirm the position of each nearby object included in the captured image.

As above described, the display control unit 170 instructs the display unit 20 to display the image information G captured by the image capture unit 11, and instructs the display unit 20 to display the identification information G1 and G2 identifying respective nearby object by superimposing the identification information G1 and G2 on the image information. With this configuration, the user can correctly confirm the position of each nearby object included in the captured image.

As above described, the imaging apparatus 1 is provided with the determination unit 160, which determines that a nearby object exists when the charge amount caused by the light received by the distance information acquisition unit 13 is saturated and the charge amount of pixel in the image capture unit 11 is not saturated.

With this configuration, the user can correctly confirm whether or not the nearby object is included in the captured image by distinguishing the nearby object from the influence of the external light.

Figure 9:
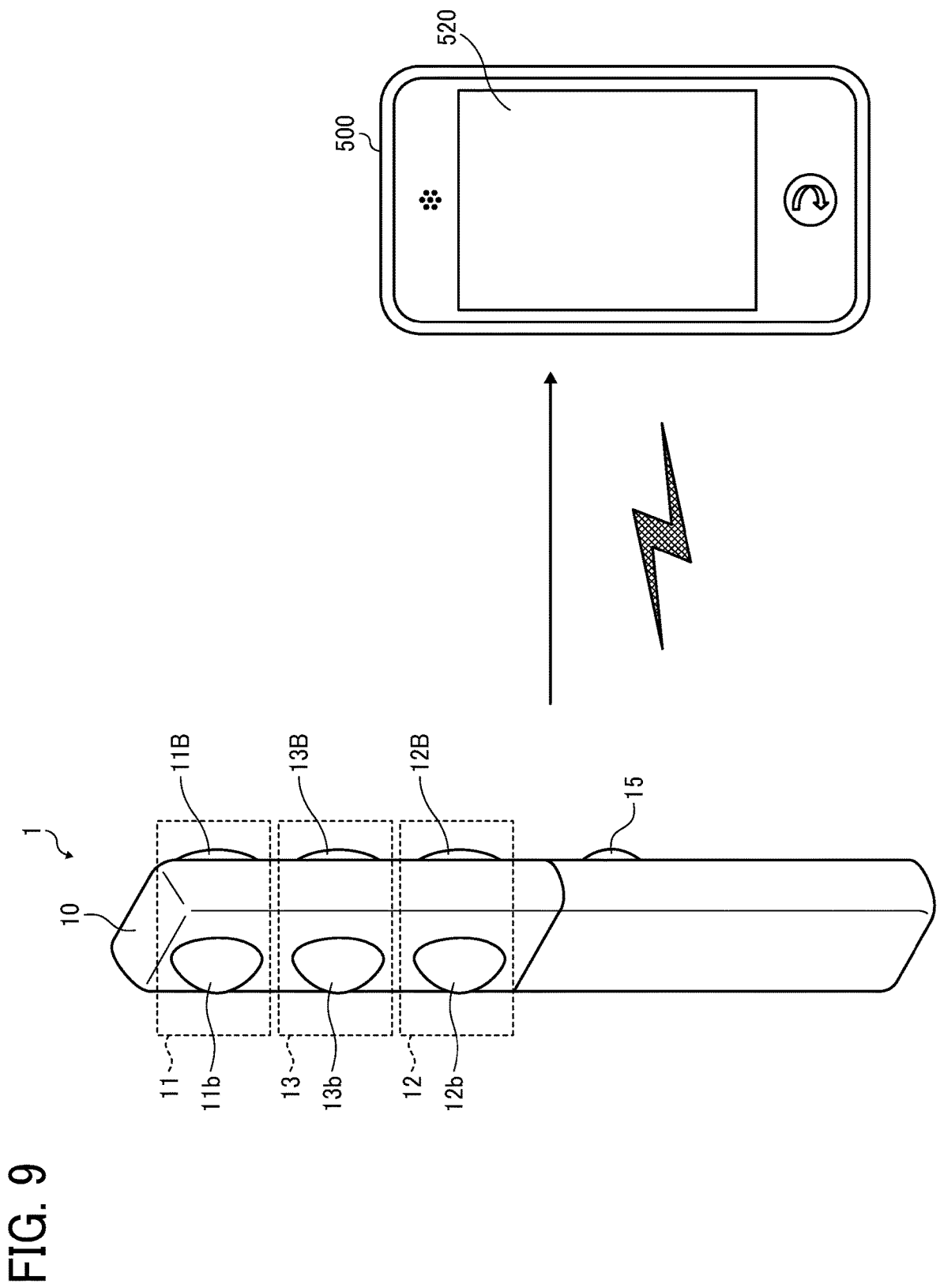
FIG. 9 is an example of external appearance of an imaging apparatus of a first modification according to an embodiment of this disclosure.
Figure 10:
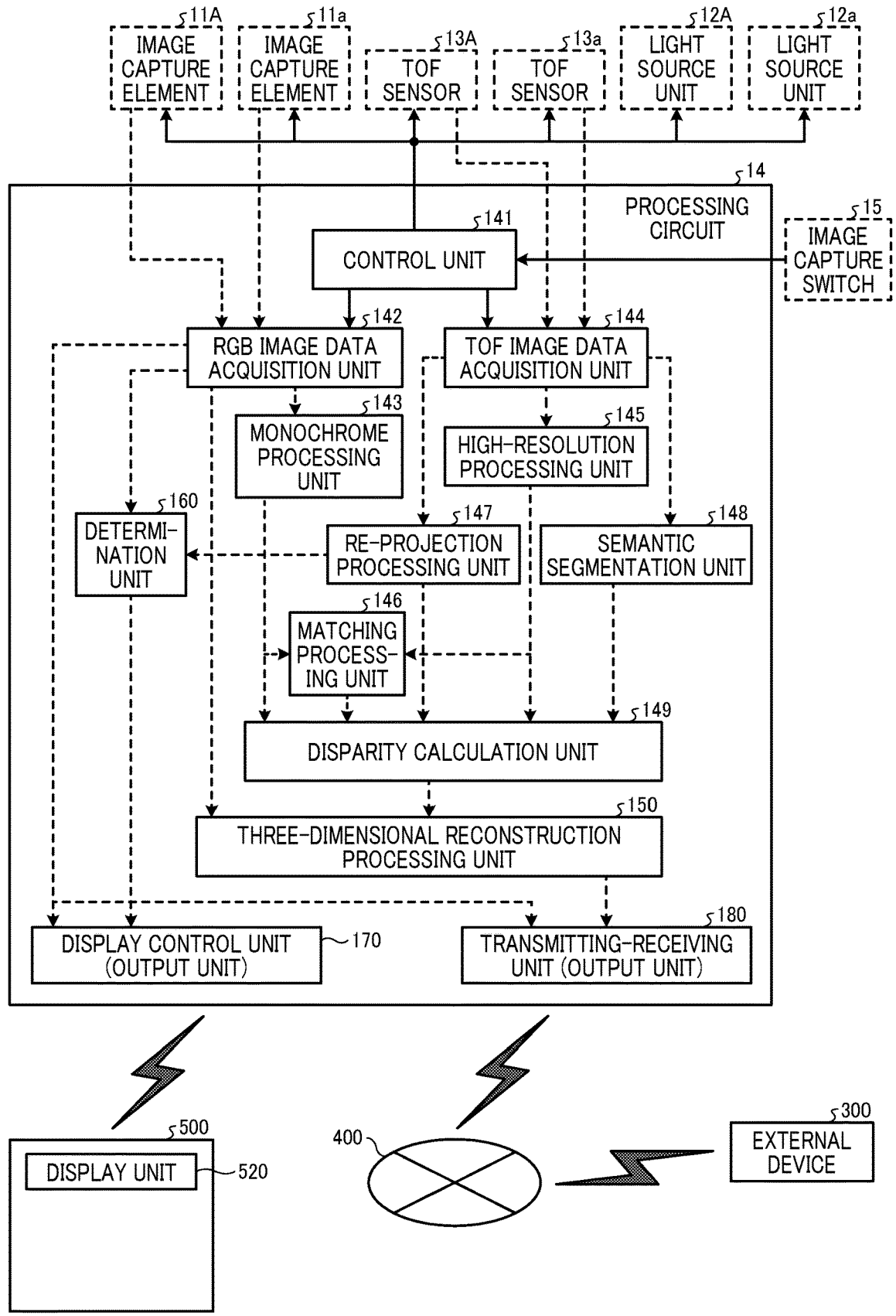
FIG. 10 is an example of functional block diagram of a processing circuit of a first modification according to an embodiment of this disclosure.

FIG. 9 is an example of external appearance of the imaging apparatus 1 of a first modification according to the embodiment. FIG. 10 is an example of functional block diagram of a processing circuit of the first modification according to the embodiment.

In the first modification, the display control unit 170 acquires the RGB image data of full-view spherical image from the RGB image data acquisition unit 142, and then instructs a display unit 520 of a display device 500 to display two-dimensional image information based on the acquired RGB image data of full-view spherical image. The display unit 520 is an example of output destination to which the two-dimensional image information is output.

With this configuration, the user can easily confirm, from the two-dimensional image information displayed by the display unit 520, whether the user himself or herself, tripod, or the like is included in the captured image, and whether the three-dimensional information having the desired layout has been acquired or not.

The display control unit 170 outputs the two-dimensional image information to the display unit 520, which is different from the external device 300 to which the transmitting-receiving unit 180 outputs the three-dimensional information.

With this configuration, the user can confirm whether the user himself or herself, tripod, or the like is included in the captured image, and whether the three-dimensional information having the desired layout has been acquired or not from the two-dimensional image information output to the display unit 520, which is different from the external device 300, without confirming the three-dimensional information output to the external device 300.

Further, the display control unit 170 can be configured to acquire or obtain the three-dimensional data of full-view spherical image from the three-dimensional reconstruction processing unit 150, and instruct the display unit 520 to display the three-dimensional information. Specifically, the display control unit 170 can select one case in which the display control unit 170 instructs the display unit 520 to display the two-dimensional image information, and another case in which the display control unit 170 instructs the display unit 520 to display the three-dimensional information, in accordance with pre-set conditions. With this configuration, the display control unit 170 can output the two-dimensional image information separately from the three-dimensional information.

The display control unit 170 superimposes the error information on the two-dimensional image information based on the error information acquired or obtained from the determination unit 160, and instructs the display unit 520 to display the two-dimensional image information superimposed with the error information.

The display control unit 170 instructs the display unit 520 to display the identification information identifying the nearby object, which is superimposed on the two-dimensional image information, based on the coordinate position information of the pixel acquired or obtained from the determination unit 160.

That is, the display control unit 170 instructs the display unit 520 to output a different display in accordance with the presence or absence of the nearby object that is determined based on the output information received from the distance information acquisition unit 13 and the output information of the image capture unit 11.

With this configuration, the user can correctly confirm whether or not the user himself or herself, and the nearby object (e.g., tripod) is included in the captured image by distinguishing the nearby object from the influence of the external light.

As above described, the display control unit 170 instructs the display unit 520 to set a display position of nearby object in accordance with a position of nearby object in a space, which means the display position of nearby object becomes different in accordance with the position of each nearby object in the space. With this configuration, the user can confirm the position of each nearby object included in the captured image.

The display control unit 170 instructs the display unit 520 to display the image information captured by the image capture unit 11, and also instructs the display unit 520 to display the identification information identifying the nearby object by superimposing the identification information on the image information. With this configuration, the user can correctly confirm the position of each nearby object included in the captured image.

Figure 11:
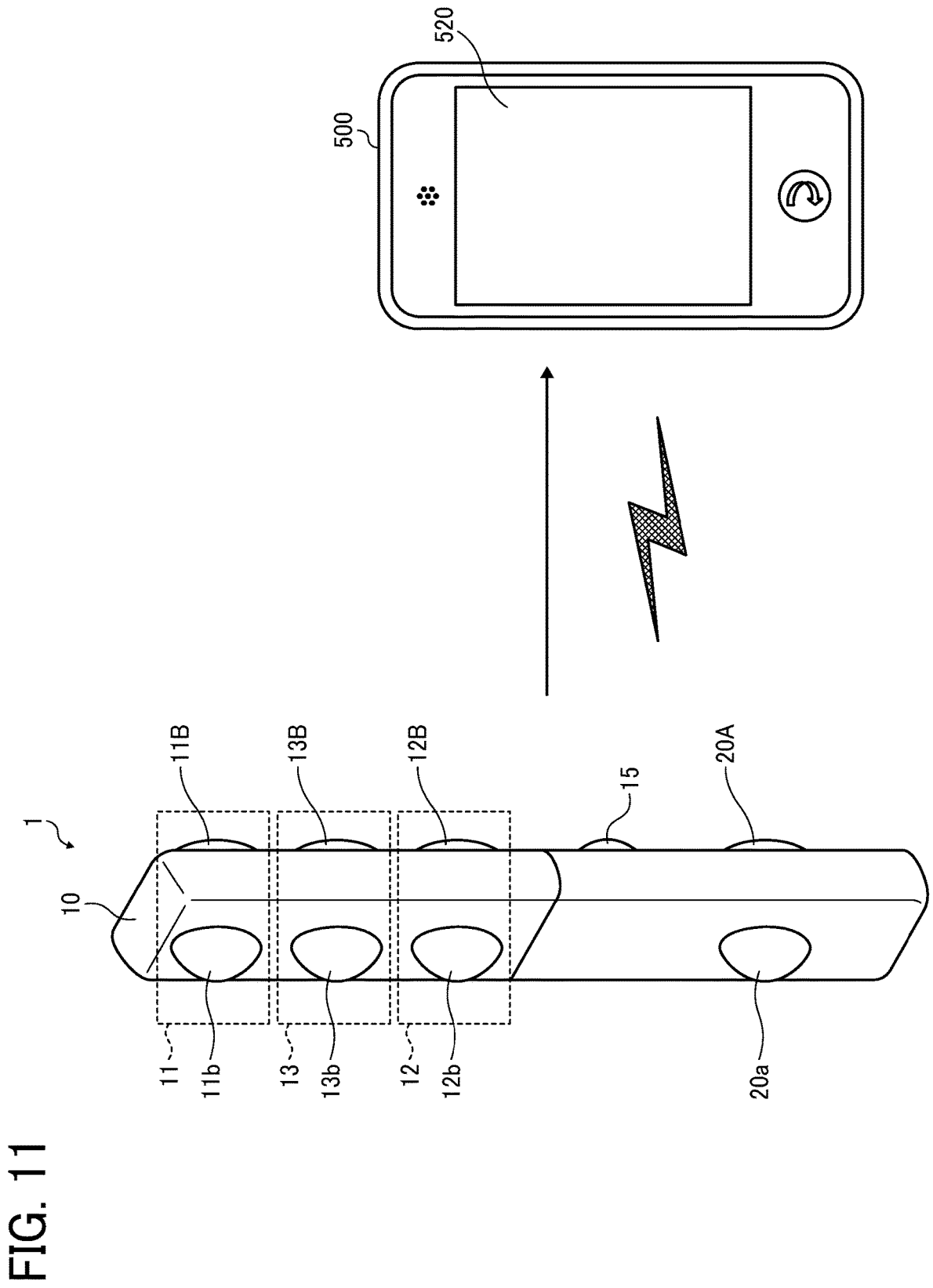
FIG. 11 is an example of external appearance of an imaging apparatus of a second modification according to an embodiment of this disclosure.
Figure 12:
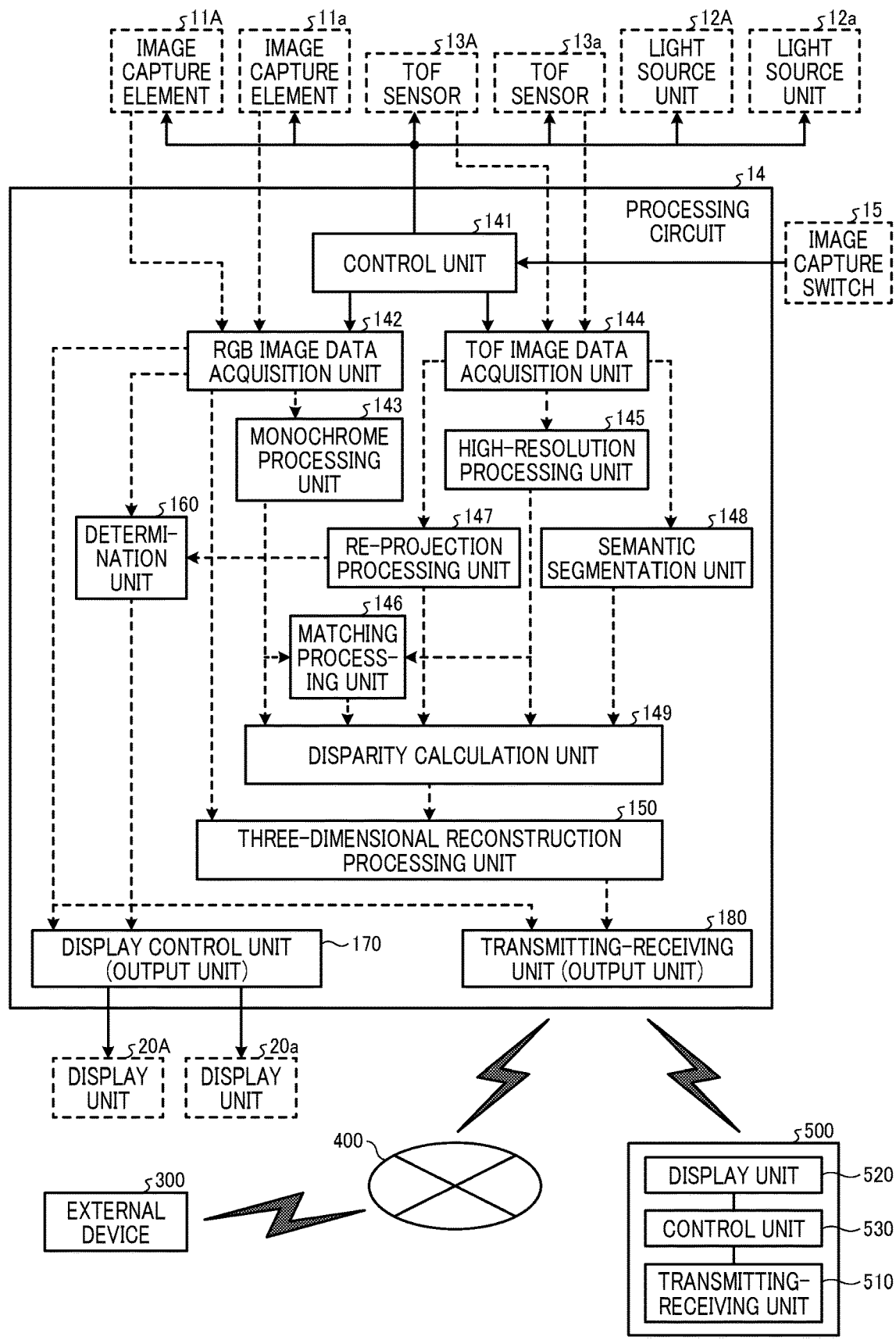
FIG. 12 is an example of functional block diagram of s processing circuit of a second modification according to an embodiment of this disclosure.

FIG. 11 is an example of external appearance of the imaging apparatus 1 of a second modification according to the embodiment. FIG. 12 is an example of functional block diagram of a processing circuit of the second modification according to the embodiment.

As to the second modification illustrated in FIG. 11, the imaging apparatus 1 includes, for example, a plurality of display units 20a and 20A instead of the display unit 20 illustrated in FIG. 1. Each of the display units 20a and 20A can be configured with, for example, light emitting diode (LED) or the like, and flashes light based on an output signal from the processing circuit 14.

The display unit 20a is provided on a first face of the housing 10 (e.g., a front side of the housing 10), and the display unit 20A is provided on a second face of the housing 10 (e.g., a rear side of the housing 10).

As to the second modification illustrated in FIG. 12, the display control unit 170 instructs the display units 20a and 20A to display information or a signal indicating a determination result acquired or obtained from the determination unit 160. For example, display units 20a and 20b may flash red if there is a close object on the respective side of the imaging apparatus 1.

Further, the transmitting-receiving unit 180 transmits or outputs the two-dimensional image information of full-view spherical image output from the RGB image data acquiring unit 142 to the display device 500 via the network 400. The display device 500 is an example of output destination to which the two-dimensional image information is output.

That is, as to the second modification, in step S3 in FIG. 5, the transmitting-receiving unit 180 acquires the RGB image data of full-view spherical image from the RGB image data acquisition unit 142, and then transmits or outputs the two-dimensional image information based on the acquired RGB image data of full-view spherical image to the display device 500.

The transmitting-receiving unit 510 of the display device 500 receives the two-dimensional image information transmitted from the transmitting-receiving unit 180 of the imaging apparatus 1.

The control unit 530 of the display device 500 instructs the display unit 520 to display the two-dimensional image information received by the transmitting-receiving unit 510.

As described above, the imaging apparatus 1 includes the image capture unit 11, and the transmitting-receiving unit 180 that outputs the two-dimensional image information captured by the image capture unit 11 separately from the three-dimensional information.

With this configuration, the user can easily confirm, from the two-dimensional image information, whether the user himself or herself, tripod, or the like is included in the captured image, and whether the three-dimensional information having the desired layout has been acquired or not, without confirming the three-dimensional information.

Therefore, the user can re-acquire the three-dimensional information while staying at a site where the three-dimensional information was acquired or obtained, with which a work or labor of re-visiting the site where the three-dimensional information was acquired or obtained can be reduced compared to a case where the user recognizes, after leaving the site where the three-dimensional information was acquired or obtained, that the user himself or herself, tripod, or the like is included in the captured image or that the three-dimensional information having the desired layout was not acquired or obtained.

The transmitting-receiving unit 180 transmits or outputs the two-dimensional image information G in step S3 before transmitting or outputting the three-dimensional information in step S11. Further, the transmitting-receiving unit 180 transmits or outputs the two-dimensional image information G in step S3 before the three-dimensional reconstruction processing unit 150 determines the three-dimensional information in step S10.

With this configuration, the user can confirm, from the two-dimensional image information, whether the user himself or herself, tripod, or the like is included in the captured image, and whether the three-dimensional information having the desired layout has been acquired or not, before confirming the three-dimensional information.

The transmitting-receiving unit 180 transmits the two-dimensional image information to the display device 500, and the display device 500 instructs the display unit 520 to display the two-dimensional image information.

With this configuration, the user can easily confirm, from the two-dimensional image information displayed by the display unit 520, whether the user himself or herself, tripod, or the like is included in the captured image, and whether the three-dimensional information having the desired layout has been acquired or not.

The transmitting-receiving unit 180 transmits the two-dimensional image information to the display device 500, which is different from the external device 300 to which the three-dimensional information is output.

With this configuration, the user can confirm whether the user himself or herself, tripod, or the like is included in the captured image, and whether the three-dimensional information having the desired layout has been acquired or not from the two-dimensional image information output to the display unit 520, which is different from the external device 300, without confirming the three-dimensional information output to the external device 300.

Further, the transmitting-receiving unit 180 can be configured to transmit the three-dimensional information to the display device 500. Specifically, the transmitting-receiving unit 180 can select one case in which the transmitting-receiving unit 180 transmits the two-dimensional image information to the display device 500, and another case in which the transmitting-receiving unit 180 transmits the three-dimensional information to the display device 500, in accordance with pre-set conditions. With this configuration, the transmitting-receiving unit 180 can transmit the two-dimensional image information to the display device 500 separately from the three-dimensional information.

Figure 13:
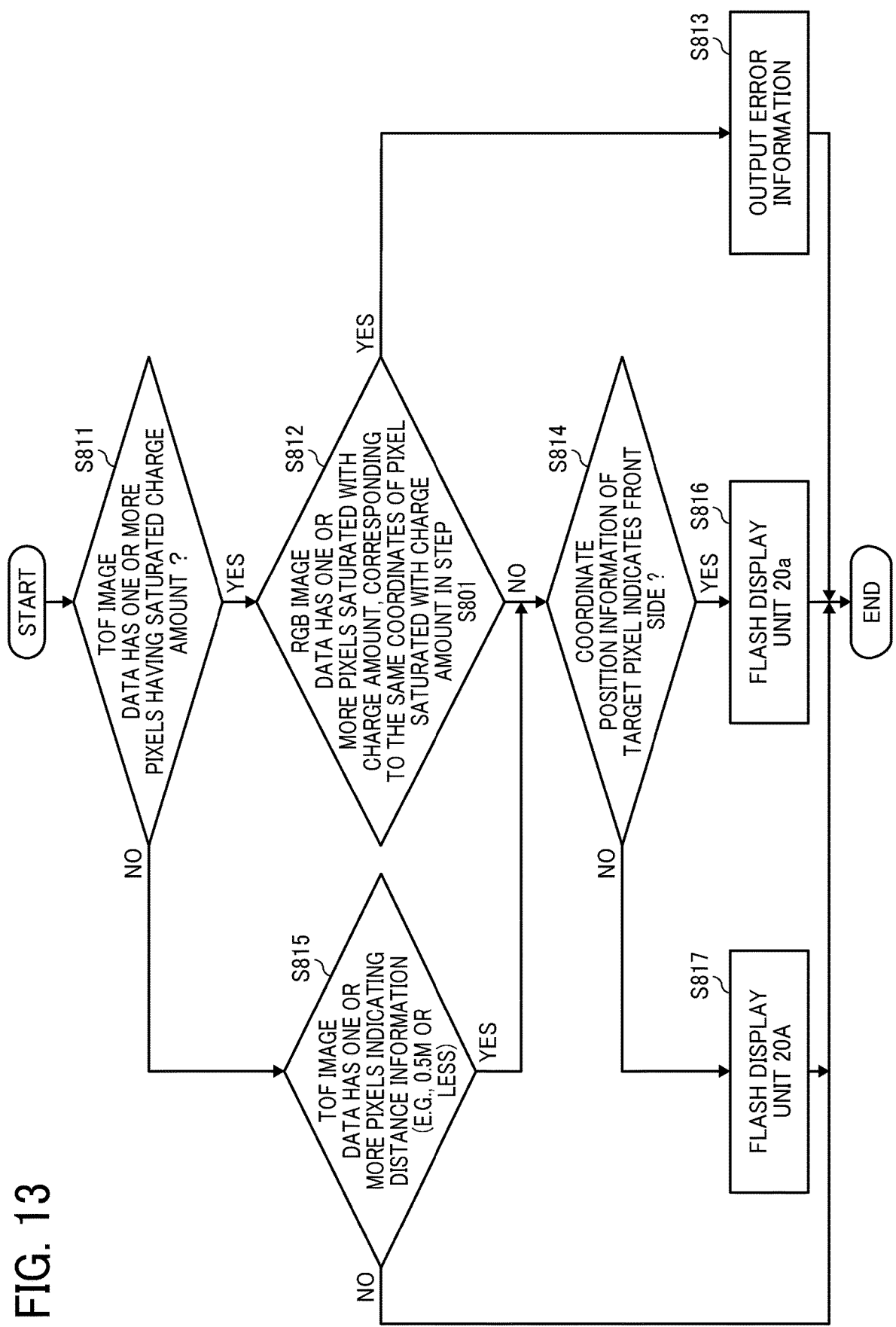
FIG. 13 is an example of flowchart of determining a nearby object of a second modification according to an embodiment of this disclosure.

FIG. 13 is an example of flowchart of determining a nearby object of the second modification according to the embodiment.

FIG. 13 is a flowchart illustrating a process of determining whether or not a nearby object is included in a captured image, which corresponds to step S9 described with reference to FIG. 5, according to the second modification.

The determination unit 160 determines, based on the TOF image data of full-view spherical image acquired or obtained from the re-projection processing unit 147, whether the TOF image data of full-view spherical image has one or more pixels having saturated charge amount (step S811).

If the determination unit 160 determines that the TOF image data of full-view spherical image has the one or more pixels having the saturated charge amount in step S811 (S811: YES), based on the RGB image data of full-view spherical image acquired or obtained from the RGB image data acquisition unit 142, the determination unit 160 determines whether the RGB image data of full-view spherical image has one or more pixel, having the same coordinates of the pixel saturated with the charge amount in step S811, have the saturated charge amount (step S812).

If the determination unit 160 determines that the RGB image data of full-view spherical image has one or more pixels saturated with the charge amount in step S812 (S812: YES), the determination unit 160 determines that the pixel having the saturated charge amount in step S801 is caused by an external light, and outputs error information to the display control unit 170.

Then, based on the error information acquired or obtained from the determination unit 160, the display control unit 170 superimposes the error information on the two-dimensional image information, and then instructs the display unit 20a or the display unit 20A to display the error information (step S813).

If the determination unit 160 determines that the RGB image data of full-view spherical image has no pixel saturated with the charge amount in step S812 (S812: NO), the determination unit 160 determines that the pixel having the saturated charge amount in step S811 is caused by a nearby object, and outputs coordinate position information of the pixel having the saturated charge amount in step S811 to the display control unit 170.

Then, the display control unit 170, based on the coordinate position information of the pixel acquired or obtained from the determination unit 160, determines whether the coordinate position information indicates the front side of the housing 10 (step S814).

If the determination unit 160 determines that the TOF image data of full-view spherical image has no pixel saturated with the charge amount in step S811 (S811:NO), based on the TOF image data of full-view spherical image acquired or obtained from the re-projection processing unit 147, the determination unit 160 determines whether the TOF image data of full-view spherical image has one or more pixels indicating given distance information (e.g., 0.5 m or less), in the TOF image data of full-view spherical image (step S815).

If the determination unit 160 determines that the TOF image data of full-view spherical image has no pixel indicating the given distance information (e.g., 0.5 m or less) in step S815 (S815: NO), the determination unit 160 ends the sequence.

If the determination unit 160 determines that the TOF image data of full-view spherical image has the one or more pixels indicating the given distance information (e.g., 0.5 m or less) in step S815 (S815: YES), the determination unit 160 proceeds the sequence to step S814.

If step S815 is YES, the determination unit 160 determines that the pixel indicating the distance information of 0.5 m or less is caused by the presence of the nearby object, and outputs the coordinate position information of the pixel indicating the distance information of 0.5 m or less in step S815 to the display control unit 170.

Then, in step S814, based on the coordinate position information of the pixel acquired or obtained from the determination unit 160, the display control unit 170 determines whether the coordinate position information of the pixel indicates the front side of the housing 10.

If the display control unit 170 determines in step S814 that the coordinate position information of the pixel indicates the front side (S814: YES), the display control unit 170 instructs the display unit 20a, disposed on the front side of the housing 10, to flash the light (step S816).

If the display control unit 170 determines in step S814 that the coordinate position information of the pixel does not indicate the front side (S814: NO), the display control unit 170 instructs the display unit 20A, disposed on the rear side of the housing 10, to flash the light (step S817).

As described above, the display control unit 170 instructs the display unit 20a or the display unit 20A to flash the light when the display control unit 170 determines that the nearby object exists, and does not instruct the display unit 20a or the display unit 20A to flash the light when the display control unit 170 determines that the nearby object does not exist.

That is, the display control unit 170 instructs the display unit 20a or the display unit 20A to output a different display in accordance with the presence or absence of the nearby object.

With this configuration, the user can correctly confirm whether or not the user himself or herself, or the nearby object (e.g., tripod) is included in the captured image by distinguishing the nearby object from the influence of the external light.

Further, the display control unit 170 instructs the display unit 20a or the display unit 20A to flash the light based on the coordinate position information of the pixel acquired or obtained from the determination unit 160.

That is, the display control unit 170 instructs the display unit 20a or the display unit 20A to display a position of nearby object in accordance with a position of nearby object in a space, which means the position of nearby object is displayed differently in accordance with the position of each nearby object in the space. With this configuration, the user can confirm the position of each nearby object included in the captured image.

Then, the display control unit 170 instructs any one of the display units 20a and 20A, closer to the nearby object, to output a different display in accordance with presence or absence of the nearby object. With this configuration, the user can correctly confirm the position of the specific object included in the captured image.

Figure 14:
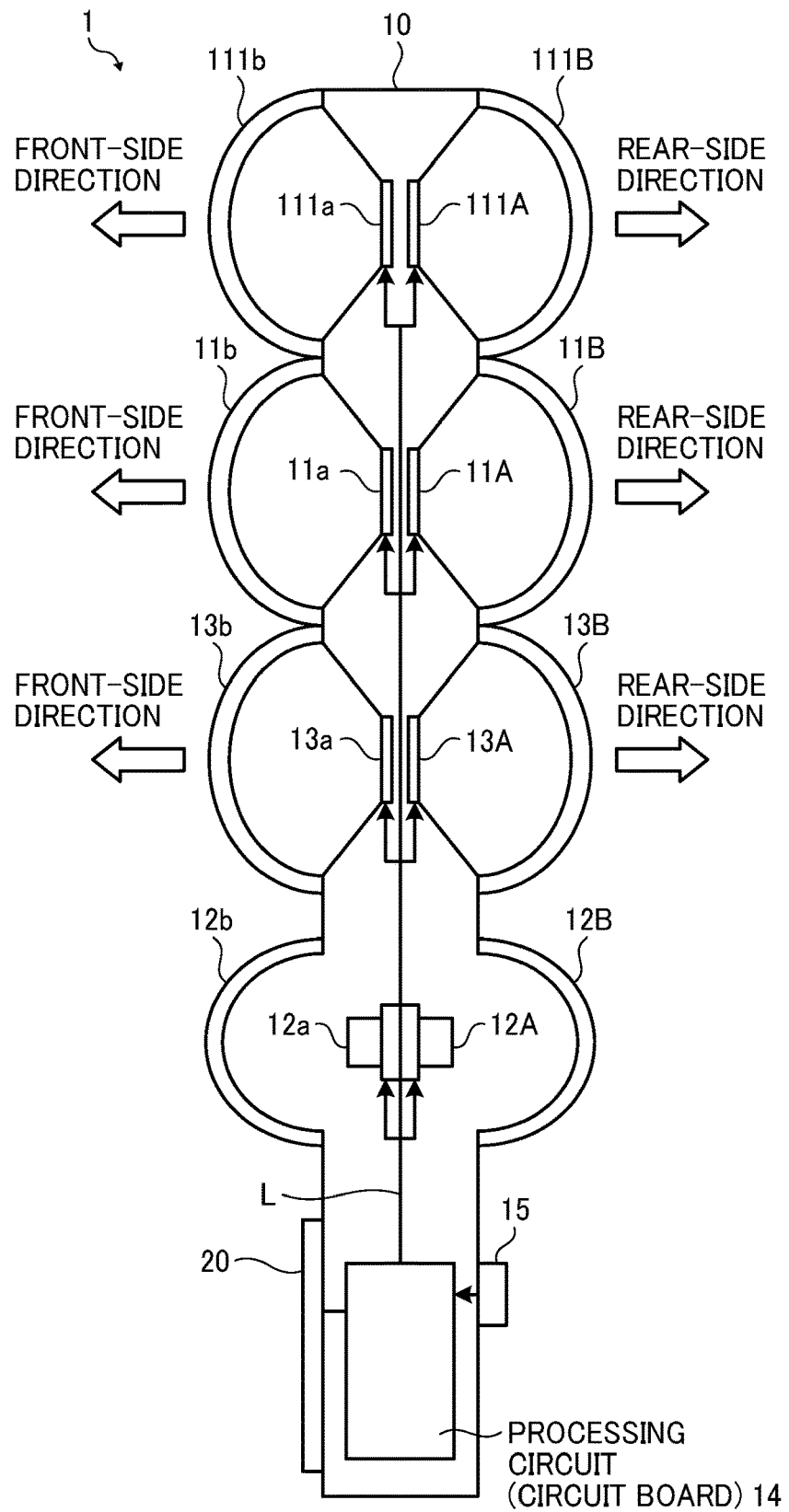
FIG. 14 is a cross sectional view of configuration of an imaging apparatus of a third modification according to an embodiment of this disclosure.

FIG. 14 is a cross sectional view of configuration of the imaging apparatus 1 of a third modification according to the embodiment.

In the third modification illustrated in FIG. 14, in addition to the configuration illustrated in FIG. 2, the imaging apparatus 1 includes, for example, another image capture units 111 having another image capture elements 111a and 111a, and another fish-eye lenses (wide-angle lenses) 111b and 111b.

In the third modification, the RGB image capture unit 11 and the another image capture units 111 are provided on the same base line. In this configuration, the processing circuit 14 can perform processing for a configuration having a plurality of eyes. That is, the RGB images of two viewpoints can be acquired or obtained by simultaneously driving the image capture unit 11 and the another image capture unit 111, provided with a given pre-set distance between the image capture unit 11 and the another image capture unit 111 along one face. Therefore, the disparity calculated from the two RGB images can be used, and the distance precision of the entire measurement range can be improved.

Specifically, when the image capture unit 11 and another image capture unit 111 for capturing RGB image data are provided, multi-baseline stereo (MSB) and epipolar plane image (EPI) processing using sum of squared differences (SSD) can be used as in the conventional disparity calculation. Therefore, by using the image capture unit 11 and another image capture unit 111, the reliability of disparity can be increased, and the higher spatial resolution and higher precision can be achieved.

As described above, the imaging apparatus 1 includes the another image capture unit 111, and the three-dimensional reconstruction processing unit 150 that determines the three-dimensional information based on the output information received from the distance information acquisition unit 13, the two-dimensional image information, and another two-dimensional image information captured by the another image capture unit 111.

Further, the imaging apparatus 1 may include another image capture unit 111 and a three-dimensional information determination unit that determines the three-dimensional information based on the two-dimensional image information and another two-dimensional image information captured by the another image capture unit 111 without using the output information from the distance information acquisition unit 13.

With this configuration, the user can confirm whether the user himself or herself, tripod, or the like is included in the captured image, and whether the three-dimensional information having the desired layout has been acquired or not from the two-dimensional image information captured by the image capture unit 11 without confirming the three-dimensional information determined by the three-dimensional reconstruction processing unit 150 based on the two-dimensional image information.

As to the above described embodiment, the imaging apparatus 1 (an example of information processing apparatus) includes the image capture unit 11 that captures two-dimensional image information, and the output unit that outputs the two-dimensional image information G for displaying, and the three-dimensional information associated with coordinates of the two-dimensional image information.

The output unit can be implemented as the display control unit 170. In this case, the display control unit 170 outputs the two-dimensional image information and the three-dimensional information for displaying.

Further, the output unit can be implemented as the transmitting-receiving unit 180. In this case, the transmitting-receiving unit 180 outputs the two-dimensional image information for displaying to an external device, and the three-dimensional information to an external device.

Further, the output unit can be implemented as the display control unit 170 and the transmitting-receiving unit 180. In this case, the display control unit 170 outputs the two-dimensional image information for displaying, and the transmitting-receiving unit 180 outputs the three-dimensional information to an external device. Alternatively, the display control unit 170 outputs the three-dimensional information to an external device, and the transmitting-receiving unit 180 outputs the two-dimensional image information for displaying.

With this configuration, the user can easily confirm, from the two-dimensional image information, whether the user himself or herself, tripod, or the like is included in the captured image, and whether the three-dimensional information having the desired layout has been acquired or not, without confirming the three-dimensional information.

Therefore, the user can re-acquire the three-dimensional information while staying at a site where the three-dimensional information was acquired or obtained, with which a work or labor of re-visiting the site where the three-dimensional information was acquired or obtained can be reduced compared to a case where the user recognizes, after leaving the site where the three-dimensional information was acquired or obtained, that the user himself or herself, tripod, or the like is included in the captured image or that the three-dimensional information having the desired layout was not acquired or obtained.

The display control unit 170 or the transmitting-receiving unit 180 outputs the two-dimensional image information G before outputting the three-dimensional information. Further, the display control unit 170 or the transmitting-receiving unit 180 outputs the two-dimensional image information G before determining the three-dimensional information.

With this configuration, the user can confirm, from the two-dimensional image information, whether the user himself or herself, tripod, or the like is included in the captured image, and whether the three-dimensional information having the desired layout has been acquired or not, before confirming the three-dimensional information.

The display control unit 170 instructs the display unit 20 and the display unit 520 to display the two-dimensional image information G. The imaging apparatus 1 is provided with the display unit 20.

With this configuration, the user can easily confirm, from the two-dimensional image information displayed by the display unit, whether the user himself or herself, tripod, or the like is included in the captured image, and whether the three-dimensional information having the desired layout has been acquired or not.

The display control unit 170 or the transmitting-receiving unit 180 outputs the two-dimensional image information G to the display unit 20 and the display unit 520 (an example of output destination), which are different from the external device 300 (an example of output destination) to which the three-dimensional information is output.

With this configuration, the user can confirm whether the user himself or herself, tripod, or the like is included in the captured image, and whether the three-dimensional information having the desired layout has been acquired or not from the two-dimensional image information output to the display unit 20 and the display unit 520, which is different from the external device 300, (an example of output destination) without confirming the three-dimensional information output to the external device 300.

The imaging apparatus 1 includes the projection unit 12 for projecting the light to the target object, the distance information acquisition unit 13 (an example of light receiving unit) for receiving light reflected from the target object, and the three-dimensional reconstruction processing unit 150 (an example of three-dimensional information determination unit) for determining the three-dimensional information based on the output information received from the distance information acquisition unit 13. The three-dimensional reconstruction processing unit 150 determines the three-dimensional information based on the output information received from the distance information acquisition unit 13 and the two-dimensional image information.

With this configuration, the user can confirm whether the user himself or herself, tripod, or the like is included in the captured image, and whether the three-dimensional information having the desired layout has been acquired or not from the two-dimensional image information captured by the image capture unit 11 without confirming the three-dimensional information determined by the three-dimensional reconstruction processing unit 150.

The imaging apparatus 1 includes the another image capture unit 111, and the three-dimensional reconstruction processing unit 150 that determines the three-dimensional information based on the output information received from the distance information acquisition unit 13, the two-dimensional image information, and the another two-dimensional image information captured by the another image capture unit 111.

As above described, the imaging apparatus 1 may include the another image capture unit 111 and the three-dimensional information determination unit that determines the three-dimensional information based on the two-dimensional image information, and another two-dimensional image information captured by another image capture unit 111 without using the output information from the distance information acquisition unit 13.

With this configuration, the user can confirm whether the user himself or herself, tripod, or the like is included in the captured image, and whether the three-dimensional information having the desired layout has been acquired or not from the two-dimensional image information captured by the image capture unit 11 without confirming the three-dimensional information determined by the three-dimensional reconstruction processing unit 150 based on the two-dimensional image information.

The three-dimensional information includes, for example, full-view spherical three-dimensional information. In this case, even if the user has difficulty to confirm whether the user himself or herself, tripod, or the like is included in the captured image, and whether the three-dimensional information having the desired layout has been acquired or not in the full-view spherical three-dimensional information, the user can easily confirm, from the two-dimensional image information captured by the image capture unit 11, whether the user himself or herself, tripod, or the like is included in the captured image, and whether the three-dimensional information having the desired layout has been acquired or not.

As to the above described embodiment, the imaging apparatus 1 (an example of information processing apparatus) includes the image capture unit 11 that captures an image of target object, the projection unit 12 that projects the light to the target object, the distance information acquisition unit 13 (an example of light receiving unit) that receives light reflected from the target object, and the display control unit 170 that instructs the display unit 20 and the display unit 520 to output a different display in accordance with the presence or absence of a specific object that is determined based on an output information of the distance information acquisition unit 13 and an output information of the image capture unit 11.

With this configuration, the user can correctly confirm whether or not a specific object, such as the user himself or herself, or nearby object (e.g., tripod), is included in the captured image by distinguishing the specific object from the influence of the external light.

The imaging apparatus 1 includes the display unit 20. With this configuration, the user can correctly confirm whether or not a specific object is included in the captured image.

The display control unit 170 instructs the display unit 20 and the display unit 520 to set a display position of specific object in accordance with a position of specific object in a space, which means the display position of each specific object becomes different in accordance with the position of each specific object in the space. With this configuration, the user can correctly confirm the position of specific object included in the captured image.

The display unit 20 includes a plurality of the display units 20A and 20a. The display control unit 170 instructs the display unit 20A or the display unit 20a closer to the nearby object, to output a different display in accordance with presence or absence of a specific object. With this configuration, the user can correctly confirm the position of the specific object included in the captured image.

The display control unit 170 instructs the display unit 20 and the display unit 520 to display the image information G captured by the image capture unit 11, and instructs the display unit 20 and the display unit 520 to display the identification information G1 and G2 identifying specific objects by superimposing the identification information G1 and G2 on the image information G. With this configuration, the user can correctly confirm the position of the specific object included in the captured image.

The imaging apparatus 1 is provided with the determination unit 160, which determines that a specific object exists when the charge amount caused by the light received by the distance information acquisition unit 13 is saturated and the charge amount of pixel in the image capture unit 11 is not saturated.

With this configuration, the user can correctly confirm whether a specific object is included in the captured image by distinguishing the specific object from the influence of the external light.

Further, each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. The programs used for performing the above described embodiments can be stored in carrier means or storage medium.

This patent application is based on and claims priority pursuant to Japanese Patent Application Nos. 2020-050539 filed on Mar. 23, 2020, and 2020-050608 filed on Mar. 23, 2020 in the Japan Patent Office, the entire disclosure of which is hereby incorporated by reference herein.

REFERENCE SIGNS LIST

1 Imaging Apparatus (Example of Information Processing Apparatus)
10 Housing
11 Image Capture Unit
11a, 11A Image Capture Element
11b, 11B Fish-eye Lens
12 Projection Unit
12a, 12A Light Source Unit
12b, 12B Wide-angle Lens
13 Distance Information Acquisition Unit (Example of Light Receiving Unit)
13a, 13A TOF Sensor
13b, 13B Wide-angle Lens
14 Processing Circuit
15 Image Capture Switch
20 Display Unit
20A, 20a Display Unit
111 Another Image Capture Unit
150 Three-Dimensional Reconstruction Processing Unit (Example of Three-Dimensional Information Determination Unit)
160 Determination Unit
170 Display Control Unit (example of output Unit)
180 Transmitting-Receiving Unit (Example of Output Unit)
300 External Device (Example of Output Destination)
500 Display Device (Example of Output Destination)
520 Display Unit (Example of Output Destination)
L Synchronization Signal Line

The invention claimed is:

1. An information processing apparatus for outputting three-dimensional information that is determined based on received light, the information processing apparatus comprising:
   image capture circuitry configured to capture two-dimensional image information;
   a projector configured to project light to a space;
   a light receiver configured to receive light reflected from one or more objects existing in the space;
   display control circuitry configured to instruct a display to display differently in accordance with presence or absence of a specific object; and
   determination circuitry configured to determine that the specific object is present when a charge amount caused by the light received by the light receiver is saturated and a charge amount of a pixel of the image capture circuitry is not saturated.

2. The information processing apparatus according to claim 1,
   wherein the output circuitry outputs the two-dimensional image information before outputting the three-dimensional information.

3. The information processing apparatus according to claim 2,
   wherein the output circuitry outputs the two-dimensional image information before determining the three-dimensional information.

4. The information processing apparatus according to claim 1,
   wherein the output circuitry instructs a display to display the two-dimensional image information.

5. The information processing apparatus according to claim 4, further comprising the display.

6. The information processing apparatus according to claim 1,
   wherein the output circuitry is configured to output the two-dimensional image to one output destination, which is different from another output destination to which the three-dimensional information is output.

7. The information processing apparatus according to claim 1, further comprising:
   a projector configured to project light to a space;
   a light receiver configured to receive light reflected from one or more objects existing in the space; and
   three-dimensional information determination circuitry configured to determine the three-dimensional information based on an output from the light receiver.

8. The information processing apparatus according to claim 7,
   wherein the three-dimensional information determination circuitry determines the three-dimensional information based on the output of the light receiver, and the two-dimensional image information.

9. The information processing apparatus according to claim 8, further comprising another image capture circuitry,
   wherein the three-dimensional information determination circuitry determines the three-dimensional information based on the output of the light receiver, the two-dimensional image information, and another two-dimensional image information captured by the another image capture circuitry.

10. The information processing apparatus according to claim 1, further comprising:
    another image capture circuitry, and
    a three-dimensional information determination circuitry configured to determine the three-dimensional information based on the two-dimensional image information, and another two-dimensional image information captured by the another image capture circuitry.

11. The information processing apparatus according to claim 1,
    wherein the three-dimensional information includes full-view spherical three-dimensional information.

12. The information processing apparatus according to claim 1, further comprising the display.

13. The information processing apparatus according to claim 1,
    wherein the display control circuitry instructs the display to set a display position of the specific object in accordance with a position of the specific object in the space.

14. The information processing apparatus according to claim 1,
    wherein the display control circuitry instructs the display to display image information captured by the image capture circuitry, and instructs the display to display identification information identifying the specific object on the image information by superimposing the identification information on the image information.

15. The information processing apparatus according to claim 1, further comprising:
output circuitry configured to output the two-dimensional image information for displaying, and the three-dimensional information associated with coordinates of the two-dimensional image information.

16. A method of processing information comprising:
capturing two-dimensional image information;
projecting light to a space;
receiving light, at a light receiver, reflected from one or more objects existing in the space;
instructing a display to display differently in accordance with presence or absence of a specific object; and
determining that the specific object is present when a charge amount caused by the light received by the light receiver is saturated and a charge amount of a pixel of the image capture circuitry is not saturated.

17. The method according to claim 16, further comprising:
outputting the two-dimensional image information for displaying; and
outputting three-dimensional information, determined based on received light and associated with coordinates of the two-dimensional image information.

18. A non-transitory computer-readable medium storing computer-readable instructions that, when executed by processing circuitry, cause the processing circuitry to perform a method comprising:
determining that a specific object is present when a charge amount caused by light received by a light receiver is saturated and a charge amount of pixel of image capture circuitry is not saturated; and
instructing a display to display differently in accordance with presence or absence of the specific object.

* * * * *